United States Patent
Regev et al.

(10) Patent No.: US 11,968,062 B1
(45) Date of Patent: *Apr. 23, 2024

(54) JOINT GAIN AND PHASE MISMATCH CANCELLER AND EQUALIZER FOR DOWNLINK AIDED BY PRECODER SIGNALING

(71) Applicant: QUALCOMM Incorporated, San Diego, CA (US)

(72) Inventors: Aviv Regev, Tel Aviv (IL); Ronen Shaked, Kfar Saba (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,738

(22) Filed: Oct. 26, 2022

(51) Int. Cl.
*H04L 25/02* (2006.01)
*H04B 7/0456* (2017.01)
(Continued)

(52) U.S. Cl.
CPC ....... *H04L 25/0202* (2013.01); *H04B 7/0456* (2013.01); *H04W 72/23* (2023.01); *H04L 25/03343* (2013.01)

(58) Field of Classification Search
CPC ........... H04L 25/03343; H04L 25/0224; H04L 25/0204; H04L 2025/03414; H04L 2025/03802; H04L 2025/0377; H04L 2025/03426; H04B 7/0452; H04B 7/0626; H04B 7/0684; H04B 7/024; H04B 7/0632;
(Continued)

(56) References Cited

U.S. PATENT DOCUMENTS

2011/0249637 A1  10/2011  Hammarwall et al.
2014/0242914 A1*  8/2014  Monroe ................. H04B 17/21
                                              455/63.4
(Continued)

FOREIGN PATENT DOCUMENTS

WO  WO-2020019336 A1  1/2020

OTHER PUBLICATIONS

International Search Report and Written Opinion—PCT/US2023/076262—ISA/EPO—Feb. 8, 2024.
(Continued)

*Primary Examiner* — Eva Y Puente
(74) *Attorney, Agent, or Firm* — Holland & Hart LLP

(57) ABSTRACT

Methods, systems, and devices for wireless communications are described. A user equipment (UE) may receive a downlink message which may include an indication of a precoder applied to one or more downlink signals. The UE may receive the one or more downlink signals using a demodulation reference signal (DMRS) and the precoder, where the one or more downlink signals may be mismatched in gain and phase. The UE may perform an iterative channel estimation procedure to estimate the downlink channel. The UE may then perform a gain and phase mismatch equalization procedure to equalize an estimated gain and phase mismatch of the one or more downlink signals based on the estimated downlink channel and the precoder. The UE may then receive one or more equalized downlink signals in accordance with the gain and phase mismatch equalization procedure.

30 Claims, 12 Drawing Sheets

(51) Int. Cl.
*H04W 72/23* (2023.01)
*H04L 25/03* (2006.01)

(58) Field of Classification Search
CPC ...... H04B 7/0689; H04B 7/10; H04B 7/0854;
H04W 72/23; H04W 48/08; H04W 72/20;
H04W 24/10; H04W 72/044; H04W
24/02; H04W 24/08; H04W 52/42; H04W
72/0446
USPC ........................................................ 375/262
See application file for complete search history.

(56) References Cited

U.S. PATENT DOCUMENTS

| | | | | |
|---|---|---|---|---|
| 2015/0030103 | A1* | 1/2015 | Hormis | H04L 1/243 |
| | | | | 375/296 |
| 2018/0146506 | A1* | 5/2018 | Zhang | H04W 56/001 |
| 2018/0302866 | A1* | 10/2018 | Zhang | H04L 25/03343 |
| 2019/0097866 | A1* | 3/2019 | Sestok, IV | H04L 27/3863 |
| 2021/0328837 | A1 | 10/2021 | Pick et al. | |

OTHER PUBLICATIONS

Zhang G., et al., "An Improved MMSE Channel Estimator for Joint Coded-precoded OFDM", IEICE Transaction on Communication, Communications Society, Tokyo, JP, vol. E92B, No. 7, Jul. 1, 2009, pp. 2520-2524, XP001547812, Figure 1.

* cited by examiner

JOINT GAIN AND PHASE MISMATCH CANCELLER AND EQUALIZER FOR DOWNLINK AIDED BY PRECODER SIGNALING

FIELD OF TECHNOLOGY

The following relates to wireless communications, including joint gain and phase mismatch canceller and equalizer for downlink aided by precoder signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support joint gain and phase mismatch canceller and equalizer for downlink aided by precoder signaling. For example, a user equipment (UE) may support gain and phase mismatch estimation and cancellation procedures to reduce network energy expenditure and increase signaling throughput. The UE may receive, from a network entity, an indication of a precoder that is associated with one or more downlink signals transmitted via a downlink channel. The UE may use the indication of the precoder and one or more demodulation reference signals (DMRS) to estimate the downlink channel and to receive and decode the one or more downlink signals, and in some cases, the one or more downlink signals may be mismatched in gain, phase, or both.

In some examples, the UE may estimate a physical channel associated with the one or more downlink signals, and may perform a gain and phase mismatch estimation procedure to estimate the mismatch between the one or more downlink signals. The UE may perform an iterative channel estimation procedure based on an estimated gain and phase, and may use the channel estimation and gain and phase estimation to perform a gain and phase mismatch cancellation and equalization procedure. In some cases, the UE may perform the gain and phase cancellation simultaneously with a channel equalization procedure.

A method for wireless communication at a UE is described. The method may include receiving, via a downlink channel, a downlink message including an indication of a precoder applied to one or more downlink signals, receiving the one or more downlink signals using at least one DMRS and the precoder, where the one or more downlink signals are at least partially mismatched in gain and phase, performing an iterative channel estimation procedure to estimate the downlink channel, performing a gain and phase mismatch equalization procedure at the UE to equalize an estimated gain and phase mismatch of the one or more downlink signals based on the estimated downlink channel and the precoder, and receiving one or more equalized downlink signals in accordance with the gain and phase mismatch equalization procedure.

An apparatus for wireless communication at a UE is described. The apparatus may include a processor, memory coupled with the processor, and instructions stored in the memory. The instructions may be executable by the processor to cause the apparatus to receive, via a downlink channel, a downlink message including an indication of a precoder applied to one or more downlink signals, receive the one or more downlink signals using at least one DMRS and the precoder, where the one or more downlink signals are at least partially mismatched in gain and phase, perform an iterative channel estimation procedure to estimate the downlink channel, perform a gain and phase mismatch equalization procedure at the UE to equalize an estimated gain and phase mismatch of the one or more downlink signals based on the estimated downlink channel and the precoder, and receive one or more equalized downlink signals in accordance with the gain and phase mismatch equalization procedure.

Another apparatus for wireless communication at a UE is described. The apparatus may include means for receiving, via a downlink channel, a downlink message including an indication of a precoder applied to one or more downlink signals, means for receiving the one or more downlink signals using at least one DMRS and the precoder, where the one or more downlink signals are at least partially mismatched in gain and phase, means for performing an iterative channel estimation procedure to estimate the downlink channel, means for performing a gain and phase mismatch equalization procedure at the UE to equalize an estimated gain and phase mismatch of the one or more downlink signals based on the estimated downlink channel and the precoder, and means for receiving one or more equalized downlink signals in accordance with the gain and phase mismatch equalization procedure.

A non-transitory computer-readable medium storing code for wireless communication at a UE is described. The code may include instructions executable by a processor to receive, via a downlink channel, a downlink message including an indication of a precoder applied to one or more downlink signals, receive the one or more downlink signals using at least one DMRS and the precoder, where the one or more downlink signals are at least partially mismatched in gain and phase, perform an iterative channel estimation procedure to estimate the downlink channel, perform a gain and phase mismatch equalization procedure at the UE to equalize an estimated gain and phase mismatch of the one or more downlink signals based on the estimated downlink channel and the precoder, and receive one or more equalized downlink signals in accordance with the gain and phase mismatch equalization procedure.

Some examples of the method, apparatuses, and non-transitory computer-readable medium described herein may further include operations, features, means, or instructions for performing the iterative channel estimation procedure to estimate a physical channel associated with the one or more downlink signals using the at least one DMRS and estimating the estimated gain and phase mismatch based on the estimated physical channel, the precoder, or both.

In some examples of the method, apparatuses, and non-transitory computer-readable medium described herein, receiving the one or more downlink signals may include operations, features, means, or instructions for applying the one or more precoder coefficients to the one or more downlink signals.

In some examples of the method, apparatuses, and non-transitory computer-readable medium described herein, performing the iterative channel estimation procedure may include operations, features, means, or instructions for performing a first channel estimation procedure, performing the gain and phase mismatch equalization procedure, and performing at least a second channel estimation procedure based on the estimated gain and phase mismatch.

In some examples of the method, apparatuses, and non-transitory computer-readable medium described herein, performing the gain and phase mismatch equalization procedure may include operations, features, means, or instructions for cancelling at least a portion of the estimated gain and phase mismatch.

In some examples of the method, apparatuses, and non-transitory computer-readable medium described herein, receiving the downlink message including the indication of the precoder may include operations, features, means, or instructions for receiving the indication of the precoder via a set of downlink precoded data, where one or more precoder coefficients may be determined based on the set of downlink precoded data.

Some examples of the method, apparatuses, and non-transitory computer-readable medium described herein may further include operations, features, means, or instructions for performing the gain and phase mismatch equalization procedure and equalizing the estimated gain and phase mismatch of the one or more downlink signals simultaneously.

In some examples of the method, apparatuses, and non-transitory computer-readable medium described herein, receiving the one or more downlink signals may include operations, features, means, or instructions for reproducing the one or more downlink signals to use for the gain and phase mismatch equalization procedure based on the at least one DMRS and the precoder.

In some examples of the method, apparatuses, and non-transitory computer-readable medium described herein, receiving the indication of the precoder may include operations, features, means, or instructions for receiving an indication of a time duration, a slot number, or both, for which the precoder may be applied to the one or more downlink signals.

In some examples of the method, apparatuses, and non-transitory computer-readable medium described herein, a value of the precoder includes a static value or a pseudo-random value and the method, apparatuses, and non-transitory computer-readable medium may include further operations, features, means, or instructions for performing the gain and phase mismatch equalization procedure based on the value of the precoder.

In some examples of the method, apparatuses, and non-transitory computer-readable medium described herein, the indication of the precoder includes a first indication of a first precoder and the method, apparatuses, and non-transitory computer-readable medium may include further operations, features, means, or instructions for receiving, via the first indication of the first precoder, a second indication of a second precoder to be applied to the one or more downlink signals after a threshold time duration and performing the gain and phase mismatch equalization procedure in accordance with the second precoder.

Some examples of the method, apparatuses, and non-transitory computer-readable medium described herein may further include operations, features, means, or instructions for receiving, from a network entity, a periodicity indication that indicates a periodicity for which the UE may be to perform the gain and phase mismatch equalization procedure based on one or more operating factors of the network entity.

In some examples of the method, apparatuses, and non-transitory computer-readable medium described herein, the gain and phase mismatch equalization procedure includes an in-phase quadrature-phase (IQ) mismatch equalization procedure.

In some examples of the method, apparatuses, and non-transitory computer-readable medium described herein, the estimated gain and phase mismatch may be a frequency-dependent gain and phase mismatch.

DETAILED DESCRIPTION

Figure 1:
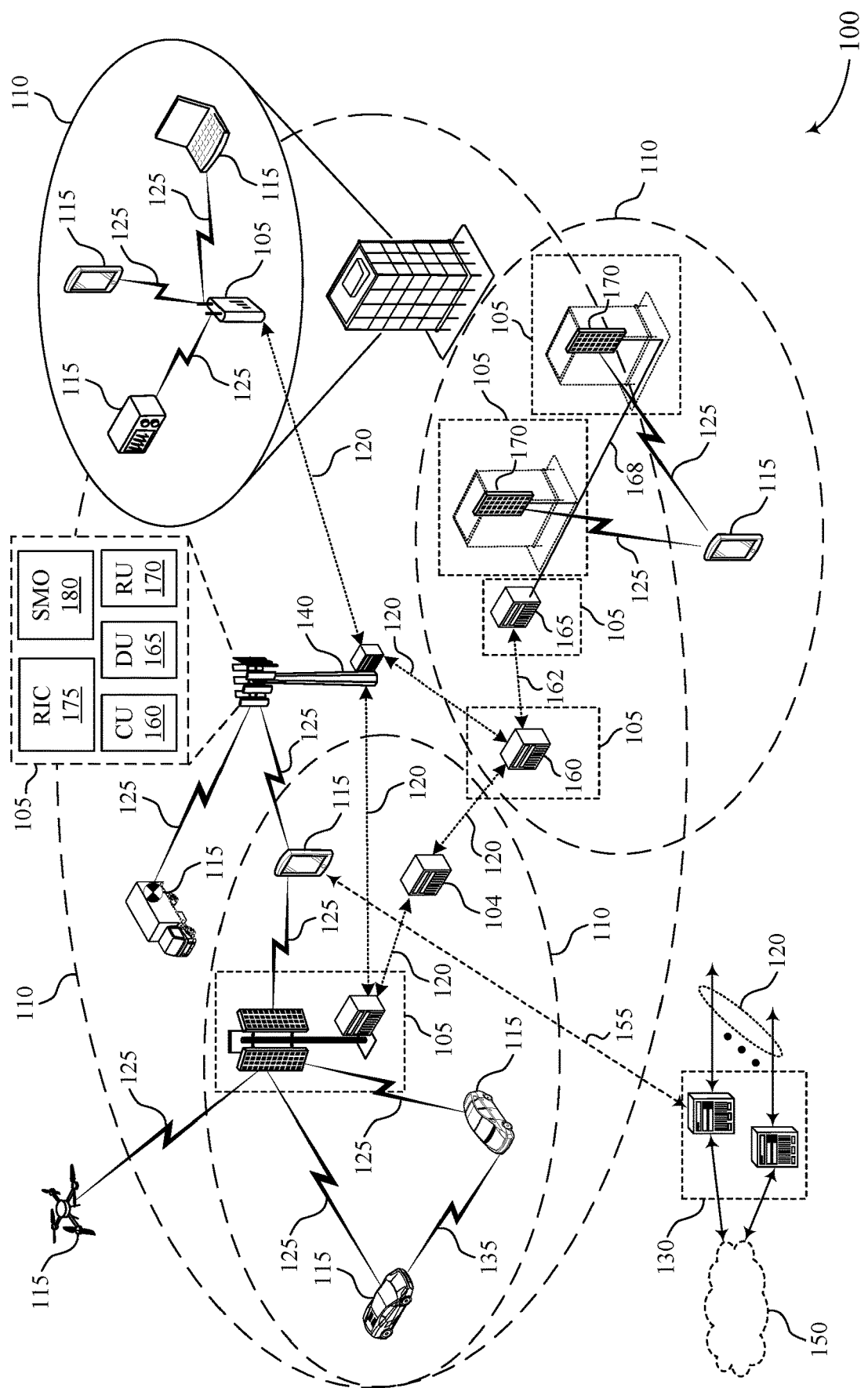
FIGS. 1 and. 2 illustrates examples of wireless communications systems that support joint gain and phase mismatch canceller and equalizer for downlink aided by precoder signaling in accordance with one or more aspects of the present disclosure.

Some wireless communications systems may use in-phase and quadrature-phase (IQ) modulators to generate radio frequency (RF) signals. For example, an IQ modulator may combine an in-phase signal with a quadrature signal to generate an RF signal. In such examples, the quadrature signal may be a phase-shifted copy of the in-phase signal (e.g., the quadrature signal may be phase-shifted by 90 degrees relative to the in-phase signal). Prior to combining and transmitting the in-phase and quadrature signals, the IQ modulator may modify the amplitude of the in-phase signal, the quadrature signal, or both, to generate different RF signals (e.g., different amplitude and phase modulated signals). In such cases, a IQ modulator may select different amplitudes and phases to increase transmit diversity in wireless communications systems.

In some cases, however, IQ modulators may have inherent impairments due to the hardware components used (e.g., different hardware processing chains for each IQ signal component) or other factors. As such, IQ modulators may produce IQ signals with non-ideal characteristics. For example, the IQ modulator may produce IQ signals with gain errors and phase errors relative to an expected gain or phase. The gain and phase errors between the IQ signals may be referred to as gain and phase mismatch, IQ impairment, frequency dependent IQ imbalance, IQ mismatch, or frequency dependent residual side band (FDRSB). Due to the gain and phase mismatch, a wireless communications system may perform various gain and phase cancellation procedures to cancel or otherwise compensate for the gain and phase mismatch. Further, a wireless communications system may operate in high frequency bands (e.g., sub-THz bands), which may utilize network entities that contain relatively large numbers of antennas, each of which may be associated with a different IQ modulator (e.g., IQ processing chain). In such cases, each IQ modulator may introduce different gain and phase mismatch, which may increase complexity for the network entity to perform gain and phase mismatch cancellation for each IQ modulator associated with each antenna. That is, performing gain and phase mismatch cancellation procedures for each IQ modulator may increase power consumption and computation complexity while also increasing hardware costs from the network perspective.

To support efficient and relatively low-power gain and phase mismatch cancellation, and to avoid relatively high power consumption and computation complexity at the network entity, gain and phase mismatch cancellation techniques may be performed by the UE. For example, the UE may perform processing procedures to perform the gain and phase mismatch cancellation with a relatively low impact on performance and power, and without additional hardware costs. In some implementations, gain and phase mismatch may occur between a precoder (P) and a channel (H), and the IQ modulator may modulate a signal after the signal is processed with the precoder (but before transmitting the signal over the channel). Since the impairment may occur between the precoder and the channel, the UE may be able to estimate the gain and phase mismatch if information about the precoder and the channel are separately available to the UE.

In such examples, the network entity may transmit an indication of the precoder and an indication of the channel separately (e.g., rather than as combined product) to the UE, and the UE may use the indication of the precoder and a demodulation reference signal (DMRS) to reproduce a transmitted signal from the network entity. The UE may then perform a channel estimation procedure (e.g., using one or more channel estimation methods or iterative channel estimation) to estimate the channel. The UE may use the estimated channel and the reproduced transmitted signal to estimate the IQ gain and phase mismatch. The UE may use the gain and phase mismatch estimation to perform the gain and phase mismatch cancellation procedure simultaneously with existing channel equalization procedures to reduce the potential impact on power expenditure and performance at the UE.

Aspects of the disclosure are initially described in the context of wireless communications systems. Aspects of the disclosure are further illustrated by and described with reference to a multiple-input multiple output (MIMO) system, a process flow, apparatus diagrams, system diagrams, and flowcharts that relate to joint gain and phase mismatch canceller and equalizer for downlink aided by precoder signaling.

FIG. 1 illustrates an example of a wireless communications system 100 that supports joint gain and phase mismatch canceller and equalizer for downlink aided by precoder signaling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support joint gain and phase mismatch canceller and equalizer for downlink aided by precoder signaling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the one or more communication links 125. For example, a carrier used for one or more communication links 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 and UE-specific search space sets for sending control information to a UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a wireless communications system 100 may include device that utilize IQ modulators to process communication signals. However, IQ modulators may have inherent impairments and introduce error, such as gain and phase mismatch, into wireless communications system 100. Due to the inherent gain and phase mismatch, a wireless communications system 100 may need to perform gain and phase cancellation procedures to cancel or otherwise compensate for the gain and phase mismatch. Further, performing gain and phase cancellation procedures at a network entity 105 may increase power consumption, computation complexity, and hardware costs (e.g., due to the large number of antennas each with a respective processing chain).

In accordance with aspects of the present disclosure the gain and phase mismatch cancellation procedures may be performed at a UE 115, which may help reduce power consumption and complexity at the network entity 105. In some cases, the network entity 105 may transmit an indication of the precoder and an indication of the channel separately (e.g., rather than as combined product) to the UE 115. The UE 115 may use the indication of the precoder and a DMRS to reproduce a transmitted signal from the network entity. The UE 115 may then perform a channel estimation procedure (e.g., using any channel estimation method) to estimate the channel. The UE 115 may use the estimated channel and the reproduced transmitted signal to estimate the IQ gain and phase mismatch. The UE 115 may use the gain and phase mismatch estimation to perform the gain and phase mismatch cancellation procedure simultaneously with existing channel equalization procedures to reduce the potential impact on power expenditure and performance at the UE 115.

Figure 2:
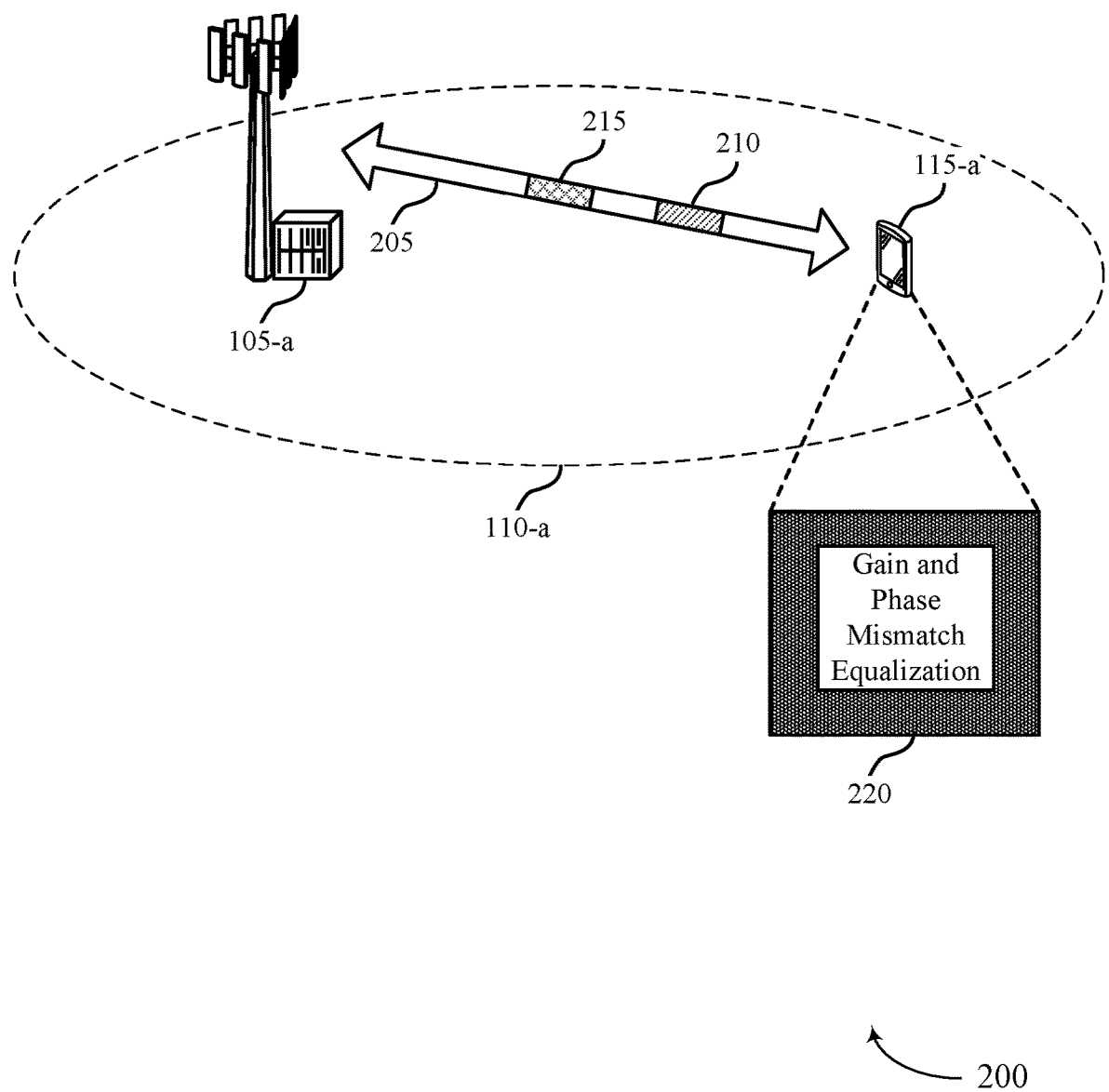

FIG. 2 illustrates an example of a wireless communications system 200 that supports joint gain and phase mismatch canceller and equalizer for downlink aided by precoder signaling in accordance with one or more aspects of the present disclosure. In some cases, the wireless communications system 200 may implement aspects of the wireless communications system 100 or may be implemented by aspects of the wireless communications system 100. For example, the wireless communications system 200 may include a network entity 105-a, a UE 115-a, and a communication link 205, which may be examples of network entities 105, UEs 115, and communication links 125 as described with reference to FIG. 1.

The network entity 105-a may communicate with the UE 115-a using the communication link 205 within the coverage area 110-a. The network entity 105-a and the UE 115-a may establish the communication link 205 via a communication channel (e.g., air interface, frequency band, or bandwidth part). In some cases, to increase communications quality, the network entity 105-a may perform various signal processing techniques to one or more communication signals 210 prior to transmitting. For example, the network entity 105-a may process the one or more communication signals 210 by performing signal precoding (e.g., applying a precoder to downlink signals) and performing IQ modulation to transmit the downlink signals in a MIMO system. In such examples, the network entity 105-a may use the precoder to increase throughput at the UE 115-a and to support MIMO communications in which multiple data streams are transmitted from the network entity 105-a. In some examples, the network entity 105-a may use the one or more IQ modulators to generate one or more RF signals (e.g., with various combinations of gain and phase). In such examples, the network entity 105-a may perform IQ modulation on the one or more communication signals 210 after applying the precoder and before transmitting the signal over the communication channel via the communication link 205.

In some examples, however, each IQ modulator may be associated with signaling mismatch or error introduced by hardware components, different hardware processing chains, and other factors. For example, an IQ modulator may generate RF signals with gain (e.g., amplitude) and phase errors or other non-ideal characteristics. Such errors may be referred to herein as gain and phase mismatch, IQ mismatch, IQ impairment, frequency dependent IQ imbalance, FDRSB, or the like. In some cases, if the IQ mismatch is left uncorrected, the wireless communications system 200 may experience decreased operating performance (e.g., limited link performance, lower transmission quality). As such, to increase operating performance, throughput, and overall communications quality, the wireless communications system 200 may compensate (e.g., cancel, equalize, or otherwise compensate) for the IQ mismatch to mitigate possible negative system effects.

In some operating bands (e.g., in high frequency bands, sub-THz bands), a network entity 105-a may use a relatively large number of antennas to form narrow beams with relatively high gain and low pathloss. In such examples, however, each antenna may be associated with a respective IQ modulator (e.g., IQ processing chain) to perform communications with one or more UEs, and each respective IQ modulator may be associated with IQ mismatch error. In such cases, completely compensating for IQ mismatch may be complex for the network entity 105-a since each IQ modulator introduces respective IQ mismatch errors and the network entity 105-a may support communications for multiple UEs 115, each of which may include multiple IQ modulators. Thus, as the number of UEs 115 supported by the network entity 105-a increases, the complexity of compensating for IQ mismatch for each IQ modulator for every UE 115 increases. Compensating for each respective IQ mismatch at the network entity 105-a may introduce increased hardware and computation complexity, increased hardware cost, and other challenges.

In some implementations, a UE 115-a may compensate (e.g., cancel, equalize, reduce, or correct) for the IQ mismatch introduced by the IQ modulator to reduce complexity and power expenditure at the network entity 105-a. For example, the UE 115-a may be able to perform processing procedures to correct the IQ mismatch with a relatively low impact on performance. For example, the UE 115-a may perform the IQ mismatch compensation without additional hardware, and with a relatively low impact on power consumption using various techniques described herein.

In some cases, IQ mismatch may occur after a precoder is applied and before transmission by the network entity 105-a over the communication channel (e.g., via communication link 205). In such cases, the UE 115-a may use information about the channel, H, (e.g., channel estimation) and the precoder, P, (e.g., precoder coefficients) separately to correct the IQ mismatch (e.g., regardless of the precoder dimensions, or whether a square or non-square precoder is used). In some cases, the UE 115-a may use separate channel and precoder information (e.g., H and P) instead of a total equivalent channel estimation (e.g., H*P), which may combine both the channel and the precoder information. In some cases, the network entity 105-a may transmit a precoder indication 215 (e.g., including precoder coefficients, precoder data, or both) applied to one or more communication signals 210 via communication link 205. For example, the UE 115-a may use the information in the precoder indication 215 (e.g., precoder coefficients, precoder data, or both) and a received reference signal (e.g., DMRS) to reproduce a one or more signals from the one or more communication signals 210. In some other cases, the UE 115-a and the network entity 105-a may have previously identified a precoder that may be used (e.g., a static value according to a rule or standard, or a pseudo-random value).

In some cases, the precoder indication 215 may include one or more precoder coefficients, indication of a time duration, a slot number, or any combination thereof, for which the precoder in the precoder indication 215 is applied. Additionally, or alternatively, the precoder indication 215 may include a first indication of a first precoder and a second indication of a second precoder, which may be applied after a threshold time duration. For example, the UE 115-a may begin processing the one or more communication signals 210 according to a first indication of a first precoder received in a precoder indication 215. After a threshold time duration, the UE 115-a may process the one or more communication signals 210 according to a second indication of a second precoder received in the precoder indication 215. In some other cases, the UE 115-a may receive the precoder indication 215 via a set of downlink precoded data and determine one or more precoder coefficients based on the set of downlink precoded data.

In some cases, the UE 115-a may perform the gain and phase mismatch estimation and cancellation procedure 220 according to various periodicities. For example, a UE 115-a may skip performing a gain and phase mismatch equalization procedure 220 for every slot to reduce power costs. In such cases, the UE 115-a may use the gain and phase mismatch information obtained in a previous slot for a current slot. In some cases, the UE 115-a may receive, from the network entity 105-a, a periodicity indication that indicates a periodicity with which the UE 115-a is to perform the gain and phase mismatch equalization procedure 220. In such cases, the indicated periodicity may be based on one or more operating factors of the network entity 105-a.

The UE 115-a may perform additional processing to perform the gain and phase mismatch equalization procedure 220 associated with the one or more communication signals 210. For example, the UE 115-a may use the precoder indication 215 and a reference signal to reproduce a transmitted signal included in the one or more communication signals 210. The UE 115-a may perform an iterative channel estimation (e.g., using one or more channel estimation methods) and may perform a gain and phase mismatch equalization procedure 220. After performing the iterative estimation procedure, the UE 115-a may perform the gain and phase cancellation according to the techniques described herein. In some examples, the UE 115-a may perform the gain and phase cancellation and channel equalization simultaneously, which may allow the UE 115-a to perform the additional processing with a low impact on performance.

While the examples described herein describe examples of performing gain and phase mismatch estimation and cancellation procedure 220 for downlink signals, same or similar techniques may apply to perform gain and phase mismatch estimation and cancellation for uplink signals.

Figure 3:
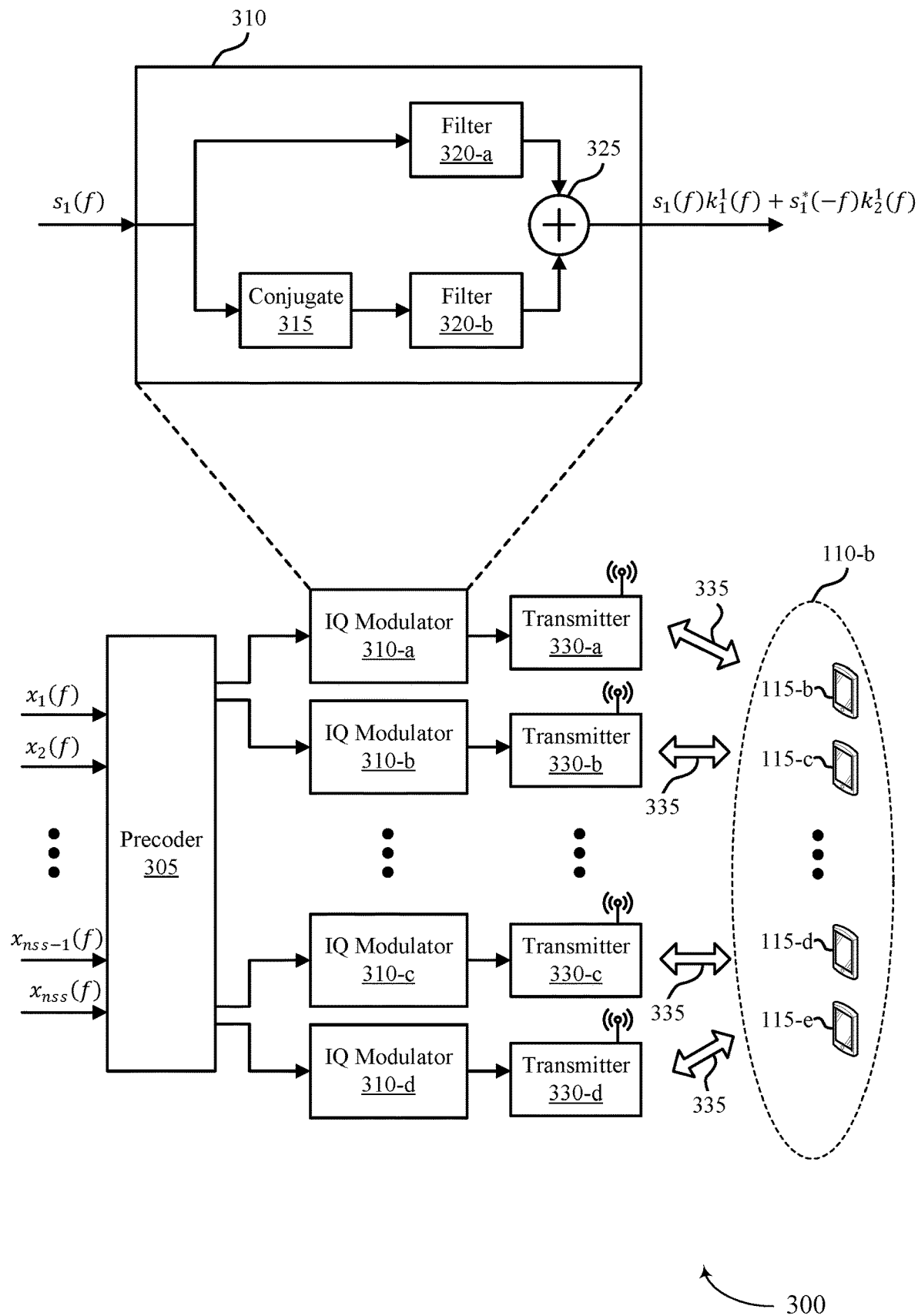
FIG. 3 illustrates an example of a multiple input multiple output (MIMO) system that supports joint gain and phase mismatch canceller and equalizer for downlink aided by precoder signaling in accordance with one or more aspects of the present disclosure.

FIG. 3 illustrates an example of a multiple input multiple output (MIMO) system 300 that supports joint gain and phase mismatch canceller and equalizer for downlink aided by precoder signaling in accordance with one or more aspects of the present disclosure. In some examples, the MIMO system 300 may be implemented by aspects of the wireless communications system 100 or the wireless communications system 200. For example, a network entity 105, or a UE 115, or both, may use aspects of the MIMO system 300 to generate, process, or transmit IQ communication signals, or any combination thereof.

The MIMO system 300 may include various signal processing components and multiple signal processing branches (e.g., IQ processing chains). The MIMO system 300 may include, for example, a digital precoder 305 which is coupled with multiple signal processing branches. Each signal processing branch may have an IQ modulator 310 (e.g., IQ modulator 310-a, IQ modulator 310-b, etc.) and a transmitter (e.g., transmitter 330-a, transmitter 330-b, transmitter 330-c, transmitter 330-d). In some cases, a network entity 105 may use the MIMO system 300 to wirelessly transmit one or more signals over a communication channel 335 (e.g., a specific frequency band or a physical channel) to one or more UEs (e.g., UE 115-b, UE 115-c, UE 115-d, UE 115-e) in a coverage area 110-b.

In some cases, the digital precoder 305 may be associated with one or more inputs including a data vector (or DMRS symbols) mathematically depicted as x(f). The digital precoder 305 may include a precoding matrix mathematically depicted as p(f) or P(f). The entries in the precoding matrix (e.g., elements of p(f) may be referred to as precoder coefficients. The digital precoder 305 may apply the precoder coefficients to the one or more data signals x(f), which may be mathematically represented as $\bar{s}(f)=P(f)\cdot\bar{x}(f)$, where $\bar{s}(f)$ is a signal to be transmitted, to perform signal preprocessing and increase transmit diversity and throughput. Once processed, the digital precoder 305 may produce one or more output signals which may be one or more transmission data signals mathematically depicted as s(f) where $s(f)=I(t)+jQ(t)$ and I(t), which represents the in-phase portion of the signal and Q(t) represents the quadrature portion of the signal.

In some cases, the one or more transmission data signals s(f) may be passed to an IQ modulator 310 (e.g., one or more of IQ modulator 310-a, IQ modulator 310-b, IQ modulator 310-c, IQ modulator 310-d). The IQ modulator 310 may include one or more components such as a conjugate block 315, a first filter 320-a (mathematically referred to as $k_1(f)$ or $K_1(f)$), a second filter 320-b (mathematically referred to as $k_2(f)$ or $K_2(f)$), and a summing component 325. The first filter 320-a and the second filter 320-b may be functions of a gain and a phase. The IQ modulator 310 may process the transmission data signals s(f) to modulate the transmission data signals with various amplitude and phase configurations. For example, a network entity 105 may use the IQ modulator 310 to generate a variety of different RF signals with unique amplitude and phase modulations.

In some implementations, however, the IQ modulator 310 may introduce error into the MIMO system 300. For example, hardware components of IQ modulator 310 may be non-ideal, or the IQ modulator 310 may produce IQ signals with non-ideal characteristics (e.g., inaccurate relative to an expected output), such as gain and phase errors, or the IQ modulator 310 may have some other defect. As such, correcting the error (e.g., IQ gain and phase mismatch error) may be advantageous for a wireless communications system (e.g., wireless communications system 100, wireless communications system 200, etc.) to increase system performance.

In some cases, the IQ mismatch errors introduced by the IQ modulator 310 may be identified (e.g., reflected) by adding the conjugate of the image of the one or more input transmission signals s(f). For example, the processing performed by IQ modulator 310 on the transmission data signal s(f) may result in an output transmission data signal $s_{out}(f)$ and may be described as $s_{out}(f)=s_{in}(f)k_1(f)+s_{in}*(-f)k_2(f)$, where $s_{in}*(-f)k_2(f)$ represents the IQ mismatch error (e.g., an undesired portion, or a portion to be cancelled or corrected). For example, a single signal processing branch may have an IQ modulator 310 which may receive a transmission data signal (e.g., from the digital precoder 305) $s_1(f)$. The IQ modulator 310 may process the signal $s_1(f)$ with a conjugate block 315, a first filter 320-a, a second filter 320-b, and a summing component 325 to produce an output signal $s_{out1}(f)=s_1(f)k_1^1(f)+s_1*(-f)k_1^2(f)$.

One or more transmitters (e.g., transmitter 330-a) may receive a processed transmission data signal $s_{out}(f)$ and transmit the signal via a communication channel 335. The communication channel 335 may alter the transmitted data signal $s_{out}(f)$ based on various conditions of the channel. The communication channel 335 may be mathematically referred to as H(f). The effect that the communication channel 335 has on the transmitted data signal may be mathematically described as $\bar{y}(f)=H(f)\bar{s}_{out}(f)$, where $\bar{y}(f)$ refers to the signal observed by a receiver (e.g., the UE 115-b).

In some examples, the MIMO system 300 may receive one or more input signals where nss is the number of input signals in the MIMO system 300. The combination of the input signals may be defined as a matrix $x(f) \triangleq [x_1(f) x_2(f) \ldots x_{nss}]^T$. The digital precoder 305 may receive the combination of input signals and produce one or more data signals for each signal processing branch (e.g., IQ modulator 310-a and transmitter 330-a) in the system, where ntx is the number of transmission data signals. The combination of transmission data signals may also be described by a matrix $s(f) \triangleq [s_1(f) s_2(f) \ldots s_{ntx}]^T$. As discussed above, each IQ modulator 310 may have two filters (e.g., the first filter 320-a and the second filter 320-b). The combination of each filter may also be defined by respective matrices $k_1(f) \triangleq [k_1^1(f)k_1^2(f) \ldots k_1^{ntx}(f)]^T$ and $k_2(f) \triangleq [k_2^1(f)k_2^2(f) \ldots k_2^{ntx}(f)]^T$. Using such definitions, the matrix expression for the observed signal with the IQ mismatch (e.g., FDRSB) may be represented by Equation 1 below:

$$y(f)=H(f)(s(f)\cdot *k_1(f)+s*(-f)\cdot *k_2(f))$$

In Equation 1, ".*" indicates an element-wise matrix multiplication, and additive noise terms may be absent from the matrix expression. The term $s(f)\cdot *k_1(f)$ may represent the desired part of the observed signal and $s*(-f)\cdot *k_2(f)$ may represent the error or mismatch.

One or more UEs 115 in a coverage area 110-b may receive one or more signals generated by the digital precoder 305, the one or more IQ modulators, and the one or more transmitters via the communication channel 335. In accordance with aspects of the present disclosure, each UE 115 (e.g., instead of or in addition to a network entity 105) may perform the gain and phase mismatch estimation and cancellation for the one or more received signals. Since the gain and phase mismatch may occur at the IQ modulator 310 (e.g., after the digital precoder 305 but before transmission over communication channel 335), the one or more UEs 115 may use information about the digital precoder 305 (e.g., in separate from information about the communication channel 335) to perform the gain and phase mismatch estimation and cancellation. In some cases, one or more UEs 115 may receive, from a network entity 105, an indication of the precoder (e.g., precoder coefficients, precoder value), and may perform the estimation and cancellation based on the indication.

In some cases, the one or more UEs 115 may have a channel equalizer to improve communications (e.g., with a network entity 105). In such cases, the UE may employ the channel equalizer to perform additional operations (as described with reference to FIG. 4) to perform the IQ gain and phase mismatch estimation and cancellation. For example, a UE 115 may perform IQ gain and phase estimation and cancellation and channel equalization simultaneously.

Figure 4:
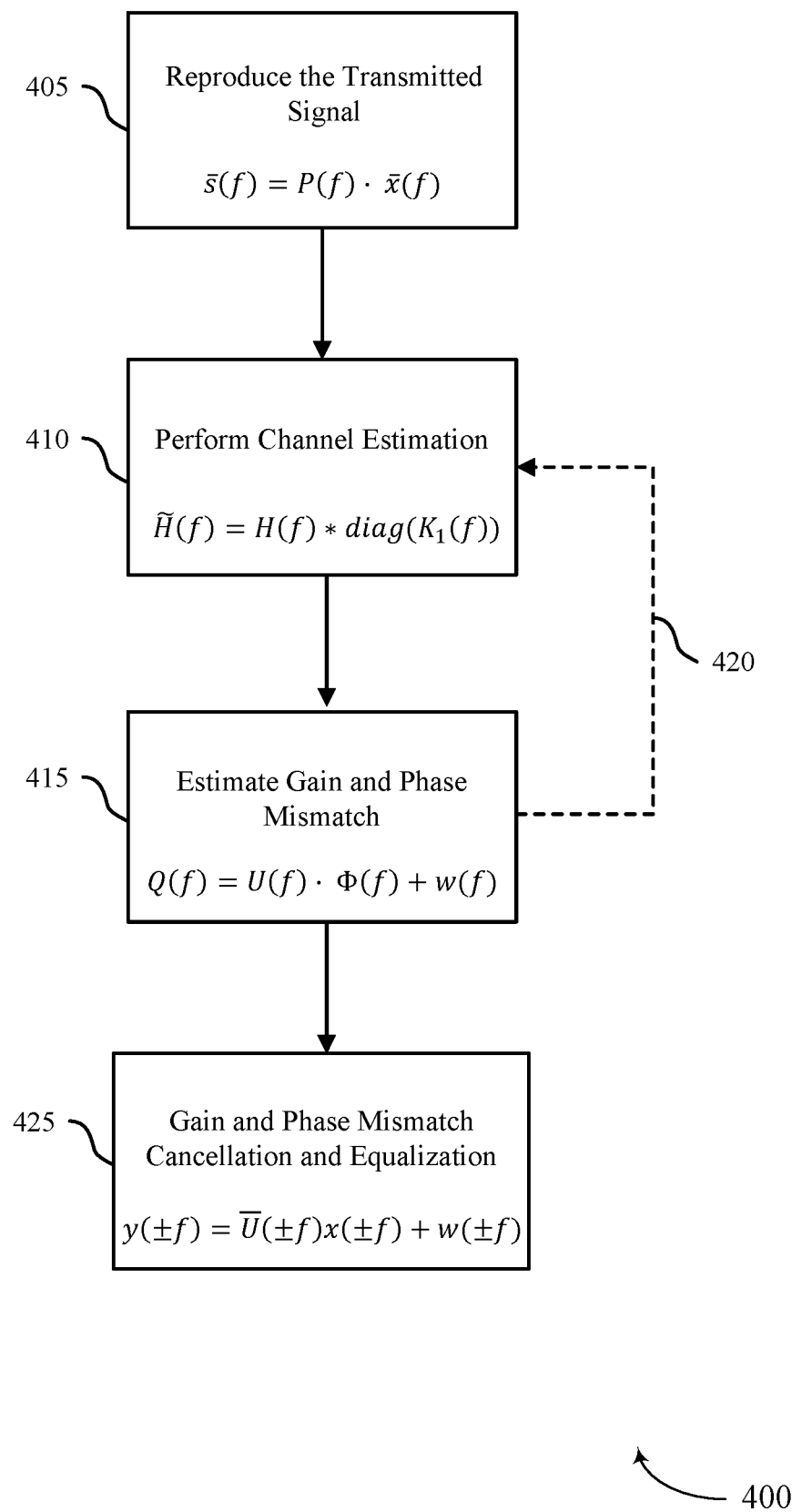
FIG. 4 illustrates an example of a flowchart that supports joint gain and phase mismatch canceller and equalizer for downlink aided by precoder signaling in accordance with one or more aspects of the present disclosure.

FIG. 4 illustrates an example of a flowchart 400 that supports joint gain and phase mismatch canceller and equalizer for downlink aided by precoder signaling in accordance with one or more aspects of the present disclosure. The operations of the flowchart 400 may be implemented by a UE 115, a network entity 105, or some other device. For example, the operations of the method described by flowchart 400 may be performed by a UE 115 as described with reference to FIGS. 1 through 3. The method described by flowchart 400 may allow a UE 115, or some other device, to perform efficient gain and phase mismatch (e.g., IQ mismatch) estimation and cancellation. In some cases, for example, the UE 115 may use estimation over a DMRS, an estimated communication channel (e.g., physical channel), a precoder, an observed signal, or any combination thereof, to perform the method described by flowchart 400.

As described in FIG. 3, the observed signal at the one or more receivers (e.g., one or more UEs 115) may be described with the additive noise w(f) by Equation 2 below:

$$y(f)=H(f)(s(f)\cdot *K_1(f)+s*(-f)\cdot *K_2(f))$$

It may be noted that, a vector may be represented as a diagonal matrix. As such, an elementwise vector multiplication expression a·*b may be equivalently represented as a matrix multiplication expression diag(b)*a. Applying that property and further simplifying, the above equation may be equivalently written as Equation 3 below:

$$y(f) = H(f)\left(\text{diag}(K_1(f))\left(s(f)+\text{diag}\left(\frac{K_2(f)}{K_1(f)}\right)s^*(-f)\right)\right) + w(f)$$

Written in this form, the term $$\frac{K_2(f)}{K_1(f)}$$

may represent the gain and phase mismatch that the UE may estimate and cancel as part of method described by flowchart 400. The estimated gain and phase mismatch may be referred to herein as Φ(f) where $$\Phi(f) = \frac{K_2(f)}{K_1(f)}.$$

At 405, the method may include reproducing the transmitted signal using the DMRS and precoder coefficients. In some cases, the transmitted signal may be represented by $s(f)=P(f)\cdot\bar{x}(f)$, where s(f) is the transmitted signal (e.g., after precoding and before IQ modulation), P(f) is the applied precoder, and $\bar{x}(f)$ is the DMRS. In order for a UE 115 to reproduce the transmitted signal (e.g., downlink signal from a network entity 105), the UE 115 may use information about the applied precoder P(f) (e.g., applied by the network entity 105) along with the DMRS $\bar{x}(f)$.

At 410, the method may include performing channel estimation using any channel estimation method (e.g., least square estimation, minimum mean square error estimation, linear, minimum mean square error estimation, etc.) on the channel $\tilde{H}(f)=H(f)*\text{diag}(K_1(f))$. Using the channel estimation and the gain and phase mismatch definitions as previously defined, the above equation may simplify to Equation 4:

$$y(f)=\tilde{H}(f)(s(f)+s^*(-f)\cdot{}^*\Phi(f))+w(f)$$

In some examples, the channel estimation may be affected by the IQ impairment (e.g., through $K_1$), so an interactive channel estimation procedure may be performed to estimate the channel (e.g., chest ~IQ mismatch impairment estimation ~chest).

At 415, the method may include estimating the gain and phase mismatch (e.g., IQ mismatch, FDRSB impairment) by using the estimated channel $\tilde{H}(f)$ and the reproduced transmission signal s(f). For example, a UE 115 (or some other wireless or network device) may use a measurement parameter Q(f) to perform the estimation. The UE 115 may take the observed signal y(f) and subtract the desired portion $\tilde{H}(f)s(f)$ to obtain $Q(f)=\tilde{H}(f)s^*(-f)\cdot{}^*\Phi(f)+w(f)$. Again, using the diagonal matrix property the equation for Q(f) can be expanded as in Equation 5 below:

$$Q(f) = \begin{bmatrix} \tilde{H}_{1,1}(f) & \tilde{H}_{1,2}(f) & \cdots & \tilde{H}_{1,ntx}(f) \\ \tilde{H}_{2,1}(f) & \tilde{H}_{2,2}(f) & \cdots & \tilde{H}_{2,ntx}(f) \\ \vdots & \vdots & \vdots & \vdots \\ \tilde{H}_{nrx,1}(f) & \tilde{H}_{nrx,2}(f) & \cdots & \tilde{H}_{nrx,ntx}(f) \end{bmatrix} \text{diag}(s_1^*(-f) s_2^*(-f) \cdots s_{ntx}^*(-f)) \begin{bmatrix} \Phi_1(f) \\ \Phi_2(f) \\ \vdots \\ \Phi_{ntx}(f) \end{bmatrix} + w(f)$$

and may be further simplified based on Equation 6 below:

$$U(f) = \begin{bmatrix} \tilde{H}_{1,1}(f) & \tilde{H}_{1,2}(f) & \cdots & \tilde{H}_{1,ntx}(f) \\ \tilde{H}_{2,1}(f) & \tilde{H}_{2,2}(f) & \cdots & \tilde{H}_{2,ntx}(f) \\ \vdots & \vdots & \vdots & \vdots \\ \tilde{H}_{nrx,1}(f) & \tilde{H}_{nrx,2}(f) & \cdots & \tilde{H}_{nrx,ntx}(f) \end{bmatrix} \text{diag}(s_1^*(-f) s_2^*(-f) \cdots s_{ntx}^*(-f))$$

such that the measurement parameter Q(f) may be expressed as $Q(f)=U(f)\cdot\Phi(f)+w(f)$. The UE 115 may then calculate gain and phase mismatch parameters $\hat{\Phi}_{LS}(f)$ and $\hat{\Phi}_{LMMSE}(f)$ with Equations 7 and 8 below:

$$\hat{\Phi}_{LS}(f)=[U(f)^H U(f)]^{-1} U(f)^H Q(f)$$

$$\hat{\Phi}_{LMMSE}(f)=[U(f)^H U(f)+\sigma_w^2\cdot I]^{-1} U(f)^H Q(f)$$

In some examples, since the channel estimation 11(f) at 410 may depend on a parameter of an IQ modulator (e.g., $K_1(f)$), and 410 and 415 may be performed iteratively as shown by 420. For example, a UE may perform the operations as described by 415 to obtain an estimation of the gain and phase mismatch. The UE may then follow 420 to perform the channel estimation at 410 and use additional information obtained in the estimation performed at 415. The UE, or some other device, may follow 420 and thereby repeat 410 and 415 one or more times, or may not follow 420 and continue to 425.

In some cases, the UE 115 may communicate to the network entity 105 whether the gain and phase estimation was successful or unsuccessful. For example, the UE 115 may determine that the estimation performed in 415 was unsuccessful and may request that the network entity 105 keep the precoder the same until the UE 115 successfully performs the gain and phase estimation.

At 425, the method may include performing the gain and phase mismatch cancellation and equalization. Continuing from Equation 4, reproduced below:

$$y(f)=\tilde{H}(f)(s(f)+s^*(-f)\cdot{}^*\Phi(f))+w(f)$$

and recalling that the transmitted signal s(f) is the product of the precoder and the input signal, $s(f)=p(f)x(f)$, the above equation may be equivalently written as Equation 9:

$$y(f)=\tilde{H}(f)(p(f)x(f)+\text{diag}(\Phi(f))p^*(-f)x^*(-f))+w(f)$$

Further, the conjugate image of y(f) may be $y^*(-f)$ and can be written as Equation 10:

$$y^*(-f)=\tilde{H}^*(-f)(p^*(-f)x^*(-f)+\text{diag}(q)^*(-f))p(f)x(f))+w^*(-f)$$

To represent the cancellation and equalization, the terms $x(\pm f)$, $y(\pm f)$, and $w(\pm f)$ may be defined respectively as:

$$x(\pm f) = \begin{bmatrix} x(f) \\ x^*(-f) \end{bmatrix}, y(\pm f) = \begin{bmatrix} y(f) \\ y^*(-f) \end{bmatrix}, w(\pm f) = \begin{bmatrix} w(f) \\ w^*(-f) \end{bmatrix}$$

For example, in a case where there are four receivers, y(f), $y^*(-f)$, and $y(\pm f)$ may be defined as follows:

$$y(f) = \begin{bmatrix} y_1(f) \\ y_2(f) \\ y_3(f) \\ y_4(f) \end{bmatrix}, y^*(-f) = \begin{bmatrix} y_1^*(-f) \\ y_2^*(-f) \\ y_3^*(-f) \\ y_4^*(-f) \end{bmatrix}, y(\pm f) = \begin{bmatrix} y_1(f) \\ y_2(f) \\ y_3(f) \\ y_4(f) \\ y_1^*(-f) \\ y_2^*(-f) \\ y_3^*(-f) \\ y_4^*(-f) \end{bmatrix}.$$

Using the structures and definitions described above, the mathematical expressions for y(f) and $y^*(-f)$ may be condensed into a single matrix Equation 11:

$$y(\pm f) = \begin{bmatrix} \tilde{H}(f)p(f) & \tilde{H}(f)\text{diag}(\Phi(f))p^*(-f) \\ \tilde{H}^*(-f)\text{diag}(\Phi^*(-f))p(f) & \tilde{H}^*(-f)p^*(-f) \end{bmatrix} x(\pm f) + w(\pm f)$$

To simplify, $\bar{U}(\pm f)$ may be defined as:

$$\bar{U}(\pm f) = \begin{bmatrix} \tilde{H}(f)p(f) & \tilde{H}(f)\text{diag}(\Phi(f))p^*(-f) \\ \tilde{H}^*(-f)\text{diag}(\Phi^*(-f))p(f) & \tilde{H}^*(-f)p^*(-f) \end{bmatrix}$$

and the Equation 11 may be simplified to Equation 12:

$y(\pm f) = \bar{U}(\pm f)x(\pm f) + w(\pm f)$

For example, the UE 115 may evaluate Equation 12 during 425 (e.g., using an advanced equalizer) to cancel and equalize the gain and phase mismatch. In such examples, the following may be assumed: y(f)∈(nrx,1), x(f)∈(nss,1), p(f) ∈(ntx,nss), s(f)∈(ntx,1), H(f)∈(nrx,ntx), Φ(f)∈(ntx,1), y(±f) ∈(2·nrx,1), w(±f)∈(2·nrx,1), and x(±f)∈(2·nss,1).

In some cases, a UE 115 may perform 425 without any additional processing hardware (e.g., an advanced equalizer). Additionally or alternatively, the UE 115 may calculate channel equalization parameters $\hat{x}_{LS}(\pm f)$ and $\hat{x}_{LMMSE}(\pm f)$ with the following Equations 13 and 14:

$\hat{x}_{LS}(\pm f) = [\bar{U}(\pm f)^H \bar{U}(f)]^{-1} \bar{U}(\pm f)^H y(\pm f)$ $\hat{x}_{LMMSE}(\pm f) = [\bar{U}(\pm f)^H \bar{U}(\pm f) + \sigma_w^2 \cdot I]^{-1} \bar{U}(\pm f)^H y(\pm f).$ As such, at 425, processing may move from the receiver antenna domain into the layers domain and perform the IQ gain and phase mismatch cancellation simultaneously (e.g., in the same process).

Figure 5:
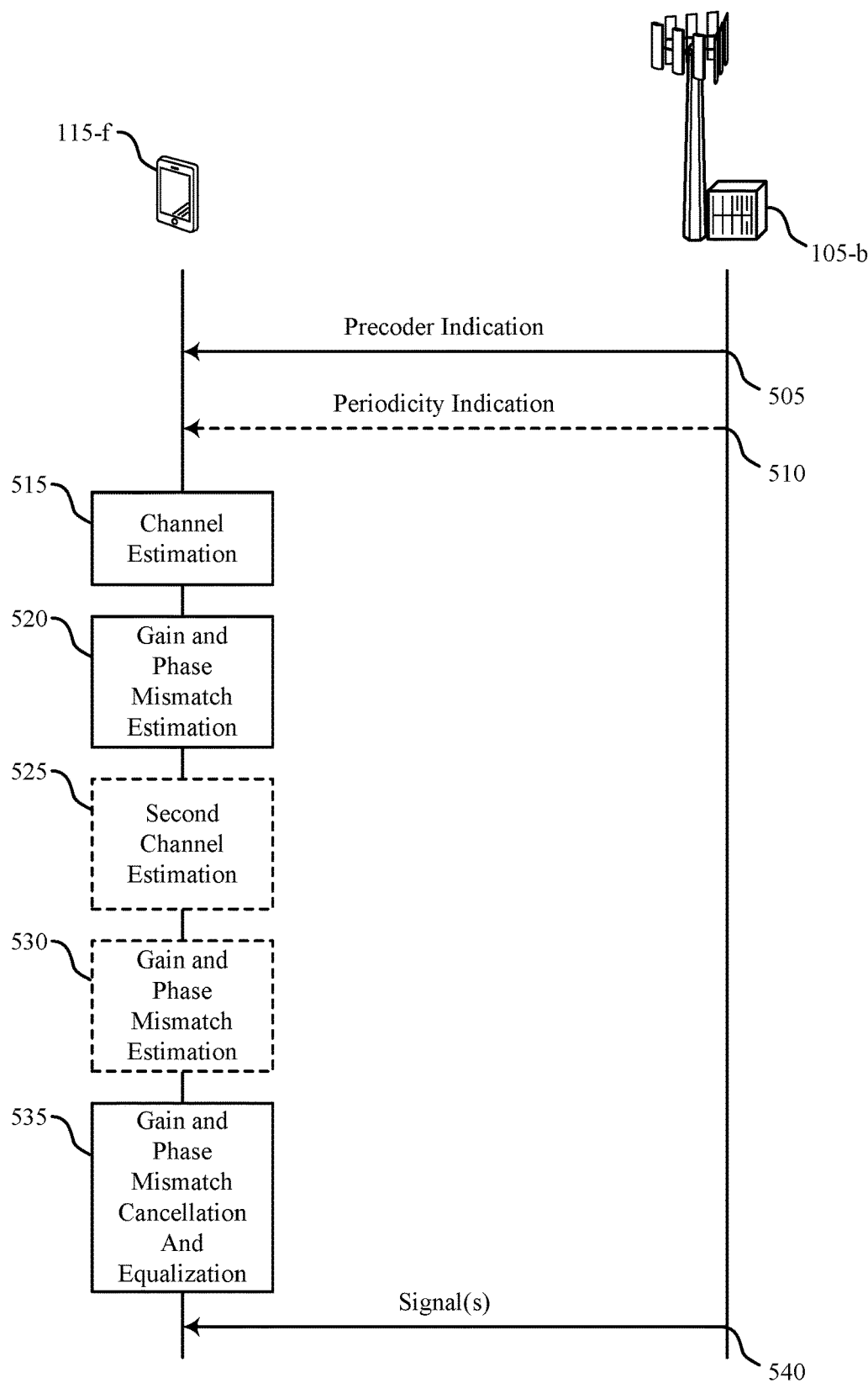
FIG. 5 illustrates an example of a process flow that supports joint gain and phase mismatch canceller and equalizer for downlink aided by precoder signaling in accordance with one or more aspects of the present disclosure.

FIG. 5 illustrates an example of a process flow 500 that supports joint gain and phase mismatch canceller and equalizer for downlink aided by precoder signaling in accordance with one or more aspects of the present disclosure. In some examples, process flow 500 may implement aspects of wireless communications system 100 or wireless communications system 200. For example, process flow 500 may support configurations for indicating a precoder to a UE for gain and phase mismatch estimation and cancellation for associated communication signals.

In the following description of process flow 500, the operations between UE 115-f and network entity 105-b may be transmitted in a different order than the order shown, or other operations may be added or removed from the process flow 500. For example, some operations may also be left out of process flow 500, or UE 115-f and network entity 105-b may be performed in different orders or at different times other operations may be added to process flow 500. Although UE 115-f and network entity 105-b are shown performing the operations of process flow 500, some aspects of some operations may also be performed by one or more other wireless or network devices.

At 505, the UE 115-f may receive, via a downlink channel, a downlink message including an indication of a precoder applied to one or more downlink signals. For example, the UE 115-f may receive one or more downlink signals using at least one DMRS and the precoder, where the one or more downlink signals are at least partially mismatched in gain and phase.

In some cases, the UE 115-f may receive an indication of a time duration, a slot number, or both, for which the precoder is applied to the one or more downlink signals. Additionally, or alternatively, the UE 115-f may receive the precoder indication via a set of downlink precoded data, where the UE 115-f may determine one or more precoder coefficients based on the set of downlink precoded data. In some cases, the indication of the precoder may include a first indication of a first precoder. The UE 115-f may receive, via the first indication of the first precoder, a second indication of a second precoder to be applied to the one or more downlink signals after a threshold time duration.

In some cases, the UE 115-f may apply the one or more precoder coefficients to the one or more downlink signals. For example, the UE 115-f may use a reference signal (e.g., DMRS) and the one or more precoder coefficients to reproduce a transmitted signal. In some cases, a value of the precoder may include a static value or a pseudo-random value. Additionally, or alternatively, the UE 115-f may perform a gain and phase mismatch equalization procedure based on the value of the precoder. In some other cases, the UE 115-f may perform the gain and phase mismatch equalization procedure in accordance with the second precoder received at 505.

At 510, the UE 115-f may receive, from the network entity 105-b, a periodicity indication that indicates a periodicity for which the UE 115-f is to perform the gain and phase mismatch equalization procedure based on one or more operating factors of the network entity 105-b. For example, in some cases, the gain and phase mismatch may have a low rate of variation and, as such, the UE 115-f may not perform the gain and phase estimation and equalization for every slot (e.g., to reduce power costs or reduce processing resource usage). For example, the UE 115-f may be able to us the gain and phase mismatch information obtained during one or more previous slots to perform the estimation and equalization for a current slot.

At 515, the UE 115-f may perform an iterative channel estimation procedure to estimate the downlink channel. In some cases, the UE 115-f may perform the iterative channel estimation procedure to estimate a physical channel associated with the one or more downlink signals using the at least one DMRS. The UE 115-f may estimate the estimated gain and phase mismatch based on the estimated physical channel, the precoder, or both.

At 520, the UE 115-f may estimate a gain and phase mismatch of the one or more downlink signals based at least in part on the estimated downlink channel and the precoder. For example, the network entity 105-b may use an IQ modulator after applying a precoder and before transmitting a signal to the UE 115-f. At 520, the UE 115-f may estimate the gain and phase mismatch (e.g., IQ impairment) in order to perform a gain and phase cancellation and equalization procedure. In some cases, the estimated gain and phase mismatch may be a frequency-dependent gain and phase mismatch.

At 525, the UE 115-f may perform at least a second channel estimation procedure based on the estimated gain and phase mismatch (e.g., at 520). For example, a UE 115-f may perform a first channel estimation procedure at 515 and a first gain and phase mismatch estimation at 520. However, the gain and phase mismatch performed at 520 may further affect the channel estimation. As such, the UE 115-f may perform a second channel estimation procedure to account for the effect of the gain and phase mismatch performed at 520.

At 530, the UE 115-f may perform at least a second gain and phase mismatch estimation procedure based on the second channel estimation procedure at 525. Additionally or alternatively, the UE 115-f may continue to perform more channel estimation and gain and phase mismatch estimation procedures to provide a more accurate channel estimation.

At 535, the UE 115-f may perform a gain and phase mismatch equalization procedure to equalize an estimated gain and phase mismatch of the one or more downlink signals based on the estimated downlink channel and the precoder. In some cases, the UE 115-f may reproduce the one or more downlink signals to use for the gain and phase mismatch equalization procedure based on at least one DMRS and the precoder received at 505.

In some cases, the UE 115-*f* may perform the gain and phase mismatch equalization procedure and equalize the estimated gain and phase mismatch of the one or more downlink signals simultaneously. Additionally, or alternatively, the UE 115-*f* may cancel at least a portion of the estimated gain and phase mismatch. In such cases, the gain and phase mismatch equalization procedure may include an IQ mismatch equalization procedure.

At 540, the UE 115-*f* may receive one or more equalized downlink signals in accordance with the gain and phase mismatch equalization procedure. For example, the UE 115-*f* may apply the calculations performed during the procedure at 535 to the signals received at 540. As such, the UE 115-*f* may cancel the gain and phase mismatch of one or more received signals at 540 based on the procedure performed at 535.

Figure 6:
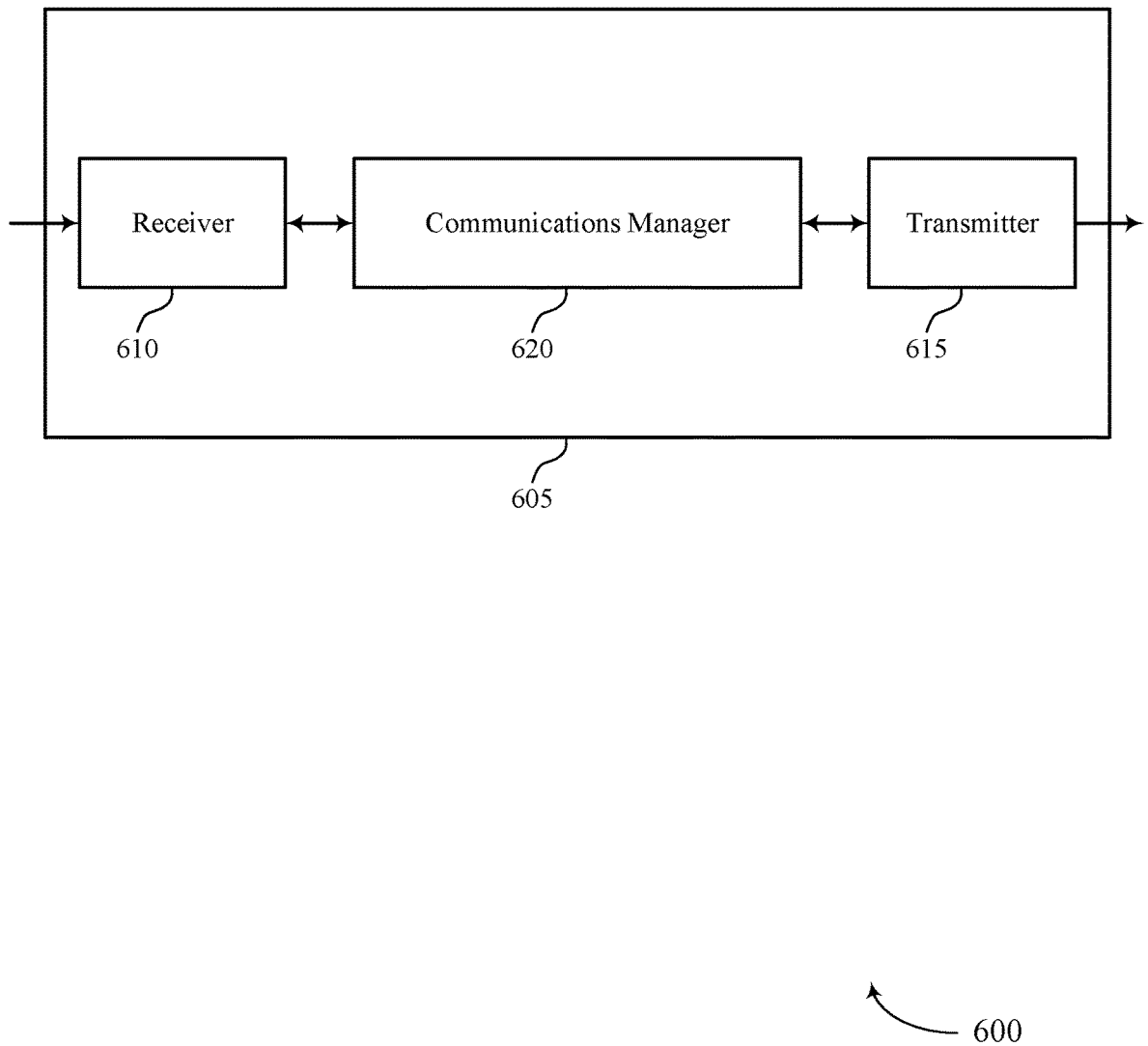
FIGS. 6 and 7 illustrate block diagrams of devices that support joint gain and phase mismatch canceller and equalizer for downlink aided by precoder signaling in accordance with one or more aspects of the present disclosure.

FIG. 6 illustrates a block diagram 600 of a device 605 that supports joint gain and phase mismatch canceller and equalizer for downlink aided by precoder signaling in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to joint gain and phase mismatch canceller and equalizer for downlink aided by precoder signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to joint gain and phase mismatch canceller and equalizer for downlink aided by precoder signaling). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of joint gain and phase mismatch canceller and equalizer for downlink aided by precoder signaling as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving, via a downlink channel, a downlink message including an indication of a precoder applied to one or more downlink signals. The communications manager 620 may be configured as or otherwise support a means for receiving the one or more downlink signals using at least one DMRS and the precoder, where the one or more downlink signals are at least partially mismatched in gain and phase. The communications manager 620 may be configured as or otherwise support a means for performing an iterative channel estimation procedure to estimate the downlink channel. The communications manager 620 may be configured as or otherwise support a means for performing a gain and phase mismatch equalization procedure at the UE to equalize an estimated gain and phase mismatch of the one or more downlink signals based on the estimated downlink channel and the precoder. The communications manager 620 may be configured as or otherwise support a means for receiving one or more equalized downlink signals in accordance with the gain and phase mismatch equalization procedure.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced design complexity and more efficient utilization of communication resources.

Figure 7:
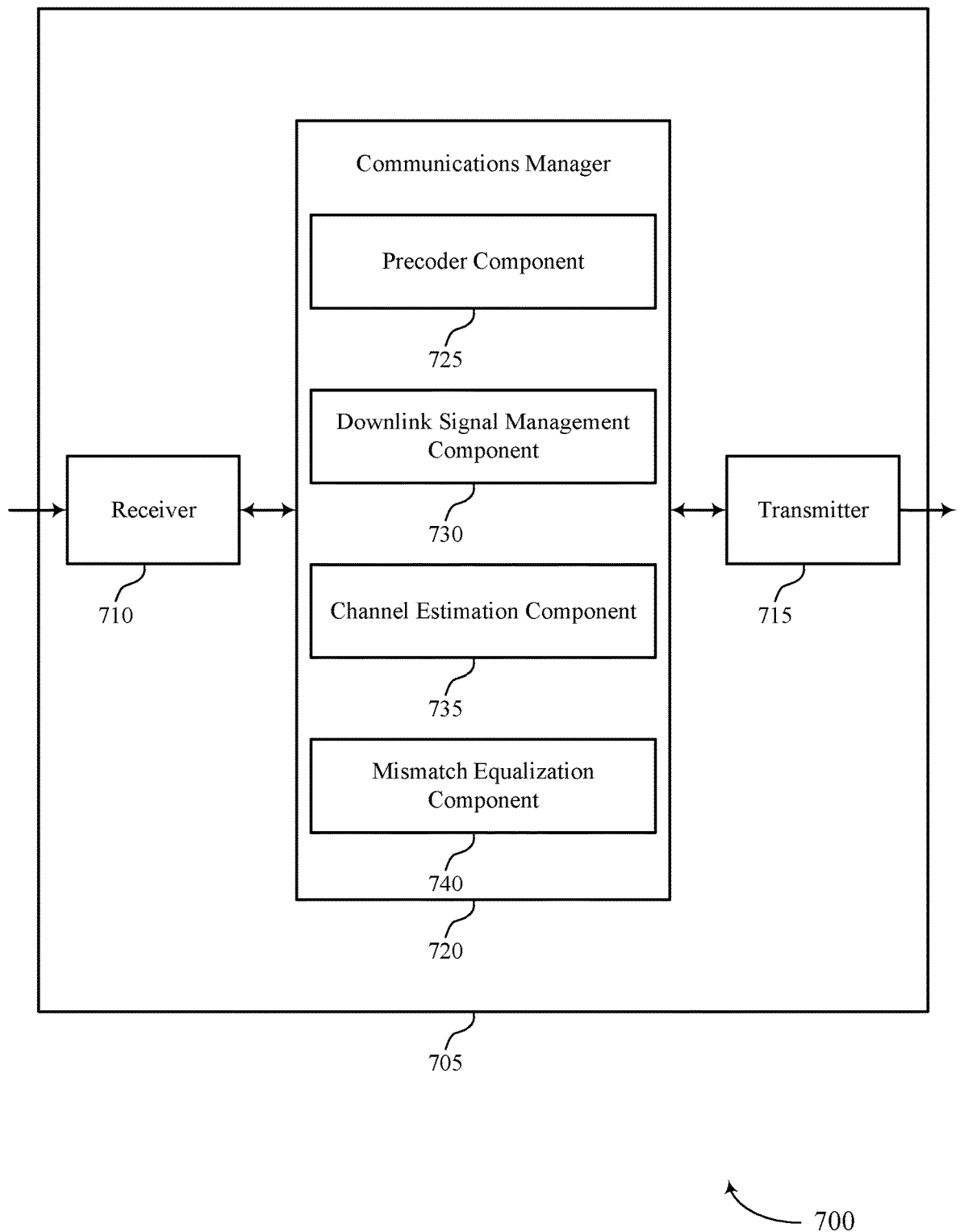

FIG. 7 illustrates a block diagram 700 of a device 705 that supports joint gain and phase mismatch canceller and equalizer for downlink aided by precoder signaling in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to joint gain and phase mismatch canceller and equalizer for downlink aided by precoder signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to joint gain and phase mismatch canceller and equalizer for downlink aided by precoder signaling). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of joint gain and phase mismatch canceller and equalizer for downlink aided by precoder signaling as described herein. For example, the communications manager 720 may include a precoder component 725, a downlink signal management component 730, a channel estimation component 735, a mismatch equalization component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The precoder component 725 may be configured as or otherwise support a means for receiving, via a downlink channel, a downlink message including an indication of a precoder applied to one or more downlink signals. The downlink signal management component 730 may be configured as or otherwise support a means for receiving the one or more downlink signals using at least one DMRS and the precoder, where the one or more downlink signals are at least partially mismatched in gain and phase. The channel estimation component 735 may be configured as or otherwise support a means for performing an iterative channel estimation procedure to estimate the downlink channel. The mismatch equalization component 740 may be configured as or otherwise support a means for performing a gain and phase mismatch equalization procedure at the UE to equalize an estimated gain and phase mismatch of the one or more downlink signals based on the estimated downlink channel and the precoder. The downlink signal management component 730 may be configured as or otherwise support a means for receiving one or more equalized downlink signals in accordance with the gain and phase mismatch equalization procedure.

Figure 8:
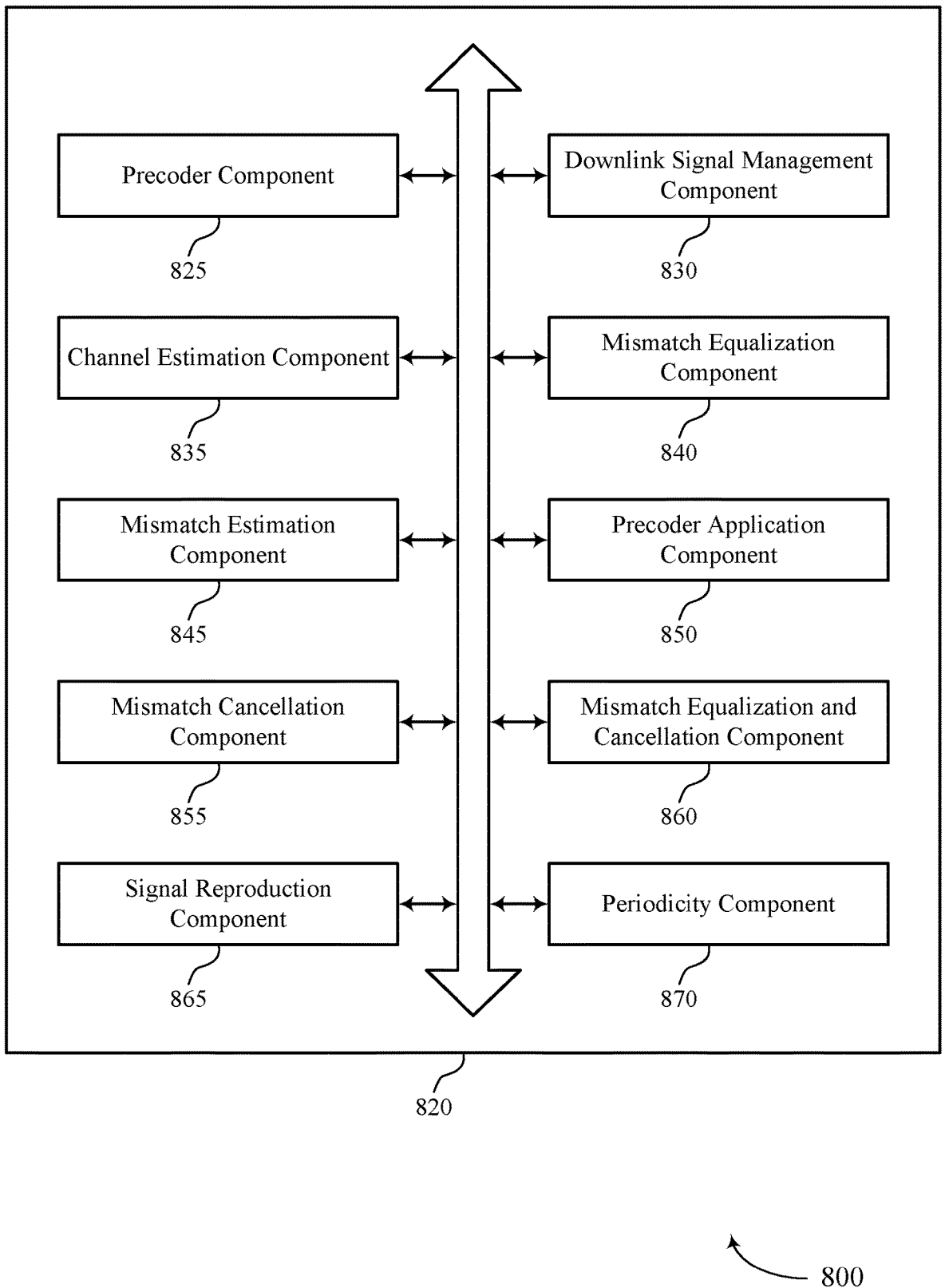
FIG. 8 illustrates a block diagram of a communications manager that supports joint gain and phase mismatch canceller and equalizer for downlink aided by precoder signaling in accordance with one or more aspects of the present disclosure.

FIG. 8 illustrates a block diagram 800 of a communications manager 820 that supports joint gain and phase mismatch canceller and equalizer for downlink aided by precoder signaling in accordance with one or more aspects of the present disclosure. The communications manager 820 may be an example of aspects of a communications manager 620, a communications manager 720, or both, as described herein. The communications manager 820, or various components thereof, may be an example of means for performing various aspects of joint gain and phase mismatch canceller and equalizer for downlink aided by precoder signaling as described herein. For example, the communications manager 820 may include a precoder component 825, a downlink signal management component 830, a channel estimation component 835, a mismatch equalization component 840, a mismatch estimation component 845, a precoder application component 850, a mismatch cancellation component 855, a mismatch equalization and cancellation component 860, a signal reproduction component 865, a periodicity component 870, or any combination thereof. Each of these components may communicate, directly or indirectly, with one another (e.g., via one or more buses).

The communications manager 820 may support wireless communication at a UE in accordance with examples as disclosed herein. The precoder component 825 may be configured as or otherwise support a means for receiving, via a downlink channel, a downlink message including an indication of a precoder applied to one or more downlink signals. The downlink signal management component 830 may be configured as or otherwise support a means for receiving the one or more downlink signals using at least one DMRS and the precoder, where the one or more downlink signals are at least partially mismatched in gain and phase. The channel estimation component 835 may be configured as or otherwise support a means for performing an iterative channel estimation procedure to estimate the downlink channel. The mismatch equalization component 840 may be configured as or otherwise support a means for performing a gain and phase mismatch equalization procedure at the UE to equalize an estimated gain and phase mismatch of the one or more downlink signals based on the estimated downlink channel and the precoder. In some examples, the downlink signal management component 830 may be configured as or otherwise support a means for receiving one or more equalized downlink signals in accordance with the gain and phase mismatch equalization procedure.

In some examples, the channel estimation component 835 may be configured as or otherwise support a means for performing the iterative channel estimation procedure to estimate a physical channel associated with the one or more downlink signals using the at least one DMRS. In some examples, the mismatch estimation component 845 may be configured as or otherwise support a means for estimating the estimated gain and phase mismatch based on the estimated physical channel, the precoder, or both.

In some examples, to support receiving the one or more downlink signals, the precoder application component 850 may be configured as or otherwise support a means for applying the one or more precoder coefficients to the one or more downlink signals.

In some examples, to support performing the iterative channel estimation procedure, the channel estimation component 835 may be configured as or otherwise support a means for performing a first channel estimation procedure.

In some examples, to support performing the iterative channel estimation procedure, the mismatch equalization component 840 may be configured as or otherwise support a means for performing the gain and phase mismatch equalization procedure. In some examples, to support performing the iterative channel estimation procedure, the channel estimation component 835 may be configured as or otherwise support a means for performing at least a second channel estimation procedure based on the estimated gain and phase mismatch.

In some examples, to support performing the gain and phase mismatch equalization procedure, the mismatch cancellation component 855 may be configured as or otherwise support a means for cancelling at least a portion of the estimated gain and phase mismatch.

In some examples, to support receiving the downlink message including the indication of the precoder, the downlink signal management component 830 may be configured as or otherwise support a means for receiving the indication of the precoder via a set of downlink precoded data, where one or more precoder coefficients are determined based on the set of downlink precoded data.

In some examples, the mismatch equalization and cancellation component 860 may be configured as or otherwise support a means for performing the gain and phase mismatch equalization procedure and equalizing the estimated gain and phase mismatch of the one or more downlink signals simultaneously.

In some examples, to support receiving the one or more downlink signals, the signal reproduction component 865 may be configured as or otherwise support a means for reproducing the one or more downlink signals to use for the gain and phase mismatch equalization procedure based on the at least one DMRS and the precoder.

In some examples, to support receiving the indication of the precoder, the precoder component 825 may be configured as or otherwise support a means for receiving an indication of a time duration, a slot number, or both, for which the precoder is applied to the one or more downlink signals.

In some examples, a value of the precoder includes a static value or a pseudo-random value, and the mismatch equalization component 840 may be configured as or otherwise support a means for performing the gain and phase mismatch equalization procedure based on the value of the precoder.

In some examples, the indication of the precoder includes a first indication of a first precoder, and the precoder component 825 may be configured as or otherwise support a means for receiving, via the first indication of the first precoder, a second indication of a second precoder to be applied to the one or more downlink signals after a threshold time duration. In some examples, the indication of the precoder includes a first indication of a first precoder, and the mismatch equalization component 840 may be configured as or otherwise support a means for performing the gain and phase mismatch equalization procedure in accordance with the second precoder.

In some examples, the periodicity component 870 may be configured as or otherwise support a means for receiving, from a network entity, a periodicity indication that indicates a periodicity for which the UE is to perform the gain and phase mismatch equalization procedure based on one or more operating factors of the network entity.

In some examples, the gain and phase mismatch equalization procedure includes an IQ mismatch equalization procedure.

In some examples, the estimated gain and phase mismatch is a frequency-dependent gain and phase mismatch.

Figure 9:
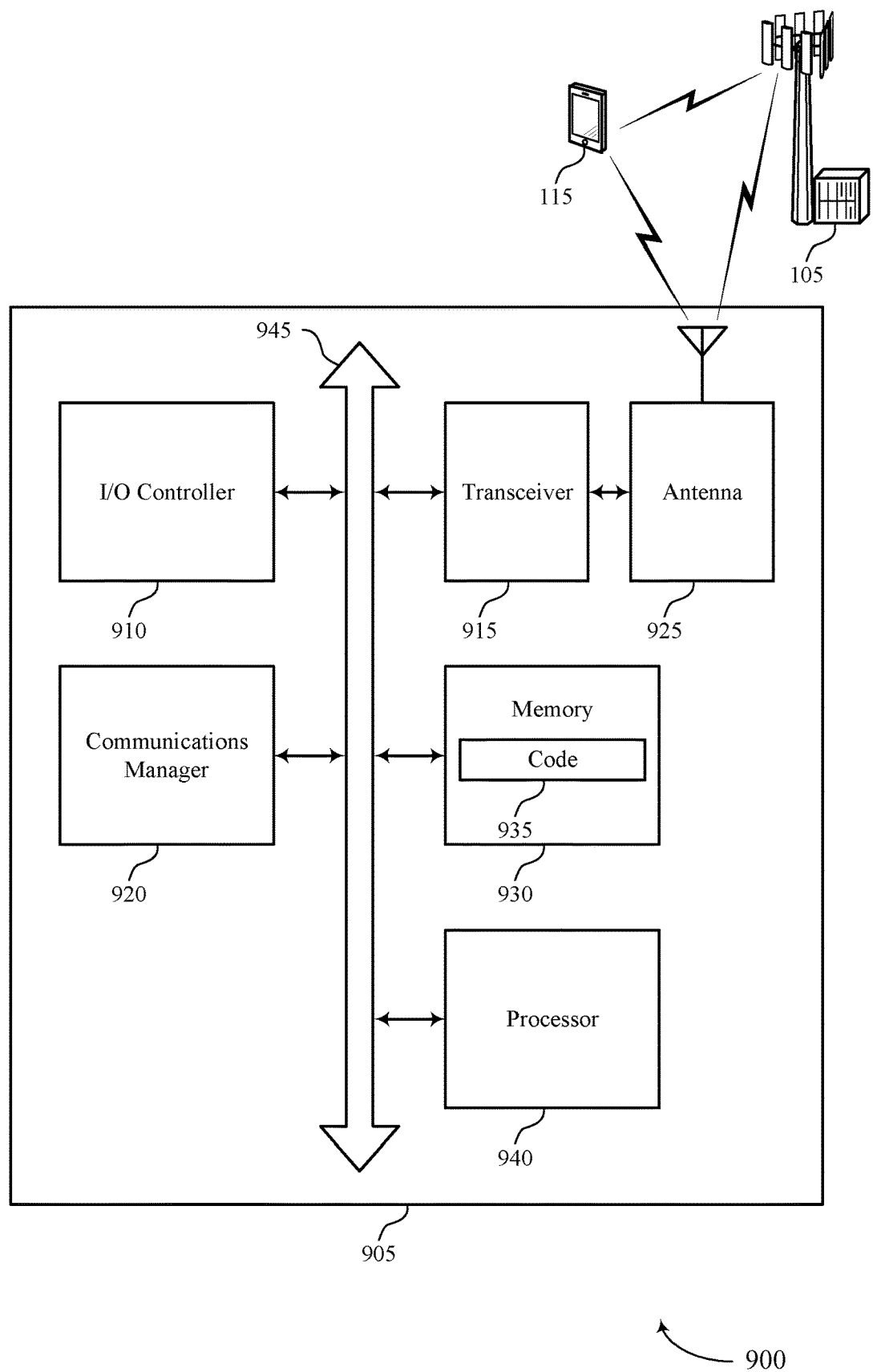
FIG. 9 illustrates a diagram of a system including a device that supports joint gain and phase mismatch canceller and equalizer for downlink aided by precoder signaling in accordance with one or more aspects of the present disclosure.

FIG. 9 illustrates a diagram of a system 900 including a device 905 that supports joint gain and phase mismatch canceller and equalizer for downlink aided by precoder signaling in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting joint gain and phase mismatch canceller and equalizer for downlink aided by precoder signaling). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, via a downlink channel, a downlink message including an indication of a precoder applied to one or more downlink signals. The communications manager 920 may be configured as or otherwise support a means for receiving the one or more downlink signals using at least one DMRS and the precoder, where the one or more downlink signals are at least partially mismatched in gain and phase. The communications manager 920 may be configured as or otherwise support a means for performing an iterative channel estimation procedure to estimate the downlink channel. The communications manager 920 may be configured as or otherwise support a means for performing a gain and phase mismatch equalization procedure at the UE to equalize an estimated gain and phase mismatch of the one or more downlink signals based on the estimated downlink channel and the precoder. The communications manager 920 may be configured as or otherwise support a means for receiving one or more equalized downlink signals in accordance with the gain and phase mismatch equalization procedure.

By including or configuring the communications manager 920 in accordance with examples as described herein, the device 905 may support techniques for reduced system complexity, more efficient utilization of communication resources, improved efficiency between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of joint gain and phase mismatch canceller and equalizer for downlink aided by precoder signaling as described herein, or the processor 940 and the memory 930 may be otherwise configured to perform or support such operations.

Figure 10:
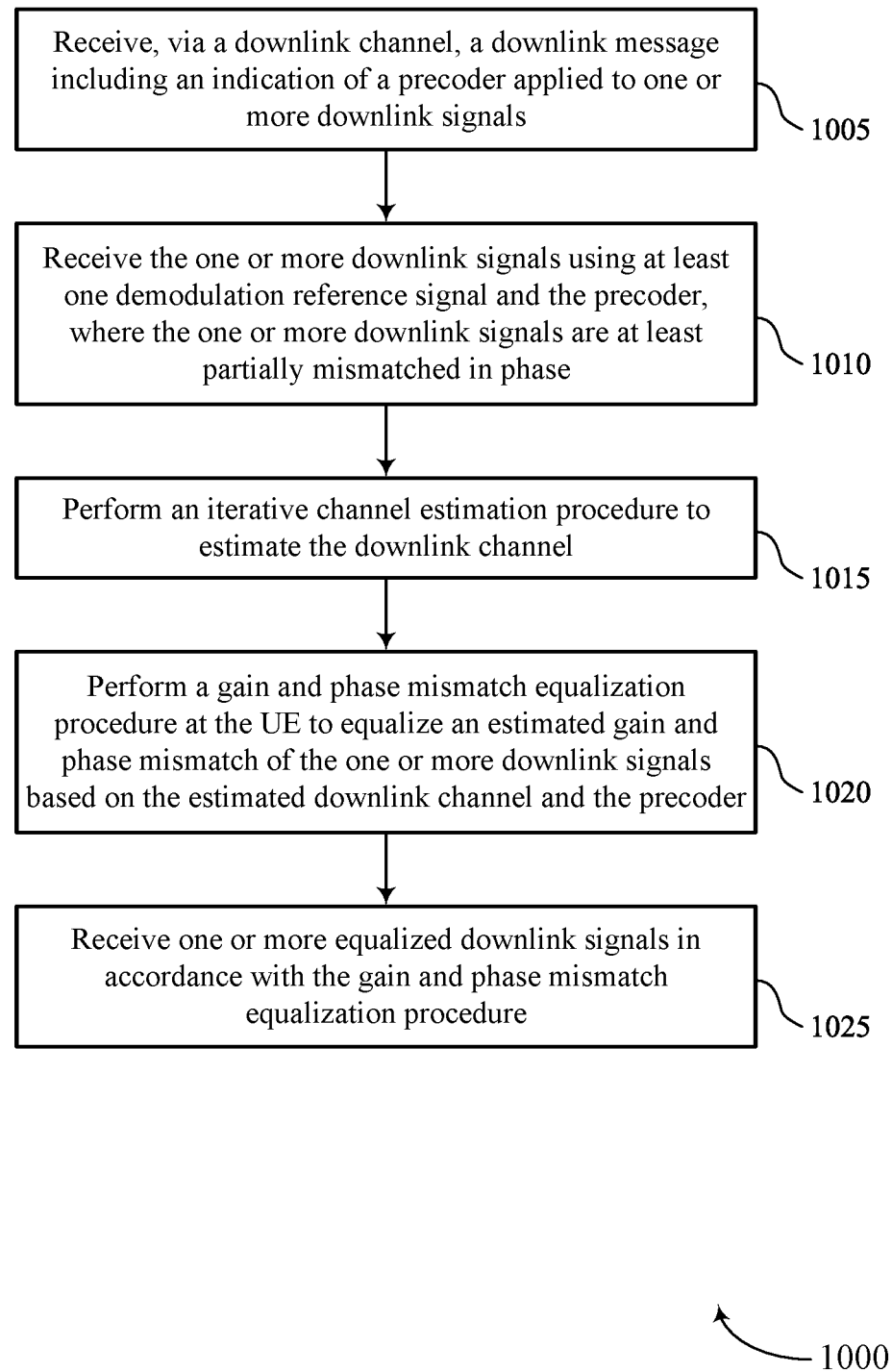
FIGS. 10 through 12 illustrate flowcharts showing methods that support joint gain and phase mismatch canceller and equalizer for downlink aided by precoder signaling in accordance with one or more aspects of the present disclosure.

FIG. 10 illustrates a flowchart illustrating a method 1000 that supports joint gain and phase mismatch canceller and equalizer for downlink aided by precoder signaling in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, via a downlink channel, a downlink message including an indication of a precoder applied to one or more downlink signals. The operations of 1005 may be performed in accordance with examples as disclosed herein. In some examples, aspects of the operations of 1005 may be performed by a precoder component 825 as described with reference to FIG. 8.

At 1010, the method may include receiving the one or more downlink signals using at least one DMRS and the precoder, where the one or more downlink signals are at least partially mismatched in gain and phase. The operations of 1010 may be performed in accordance with examples as disclosed herein. In some examples, aspects of the operations of 1010 may be performed by a downlink signal management component 830 as described with reference to FIG. 8.

At 1015, the method may include performing an iterative channel estimation procedure to estimate the downlink channel. The operations of 1015 may be performed in accordance with examples as disclosed herein. In some examples, aspects of the operations of 1015 may be performed by a channel estimation component 835 as described with reference to FIG. 8.

At 1020, the method may include performing a gain and phase mismatch equalization procedure at the UE to equalize an estimated gain and phase mismatch of the one or more downlink signals based on the estimated downlink channel and the precoder. The operations of 1020 may be performed in accordance with examples as disclosed herein. In some examples, aspects of the operations of 1020 may be performed by a mismatch equalization component 840 as described with reference to FIG. 8.

At 1025, the method may include receiving one or more equalized downlink signals in accordance with the gain and phase mismatch equalization procedure. The operations of 1025 may be performed in accordance with examples as disclosed herein. In some examples, aspects of the operations of 1025 may be performed by a downlink signal management component 830 as described with reference to FIG. 8.

Figure 11:
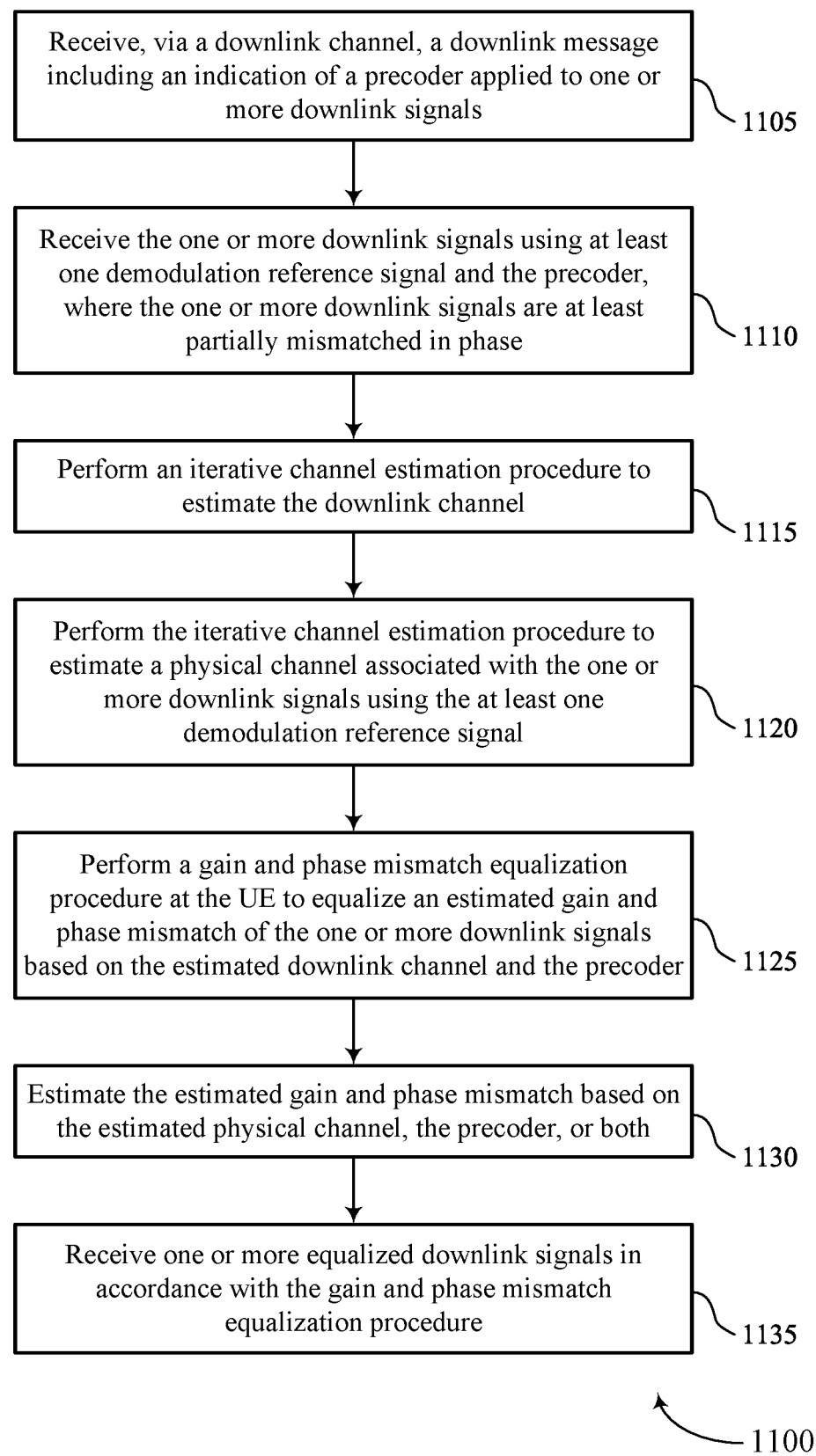

FIG. 11 illustrates a flowchart illustrating a method 1100 that supports joint gain and phase mismatch canceller and equalizer for downlink aided by precoder signaling in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, via a downlink channel, a downlink message including an indication of a precoder applied to one or more downlink signals. The operations of 1105 may be performed in accordance with examples as disclosed herein. In some examples, aspects of the operations of 1105 may be performed by a precoder component 825 as described with reference to FIG. 8.

At 1110, the method may include receiving the one or more downlink signals using at least one DMRS and the precoder, where the one or more downlink signals are at least partially mismatched in gain and phase. The operations of 1110 may be performed in accordance with examples as disclosed herein. In some examples, aspects of the operations of 1110 may be performed by a downlink signal management component 830 as described with reference to FIG. 8.

At 1115, the method may include performing an iterative channel estimation procedure to estimate the downlink channel. The operations of 1115 may be performed in accordance with examples as disclosed herein. In some examples, aspects of the operations of 1115 may be performed by a channel estimation component 835 as described with reference to FIG. 8.

At 1120, the method may include performing the iterative channel estimation procedure to estimate a physical channel associated with the one or more downlink signals using the at least one DMRS. The operations of 1120 may be performed in accordance with examples as disclosed herein. In some examples, aspects of the operations of 1120 may be performed by a channel estimation component 835 as described with reference to FIG. 8.

At 1125, the method may include performing a gain and phase mismatch equalization procedure at the UE to equalize an estimated gain and phase mismatch of the one or more downlink signals based on the estimated downlink channel and the precoder. The operations of 1125 may be performed in accordance with examples as disclosed herein. In some examples, aspects of the operations of 1125 may be performed by a mismatch equalization component 840 as described with reference to FIG. 8.

At 1130, the method may include estimating the estimated gain and phase mismatch based on the estimated physical channel, the precoder, or both. The operations of 1130 may be performed in accordance with examples as disclosed herein. In some examples, aspects of the operations of 1130 may be performed by a mismatch estimation component 845 as described with reference to FIG. 8.

At 1135, the method may include receiving one or more equalized downlink signals in accordance with the gain and phase mismatch equalization procedure. The operations of 1135 may be performed in accordance with examples as disclosed herein. In some examples, aspects of the operations of 1135 may be performed by a downlink signal management component 830 as described with reference to FIG. 8.

Figure 12:
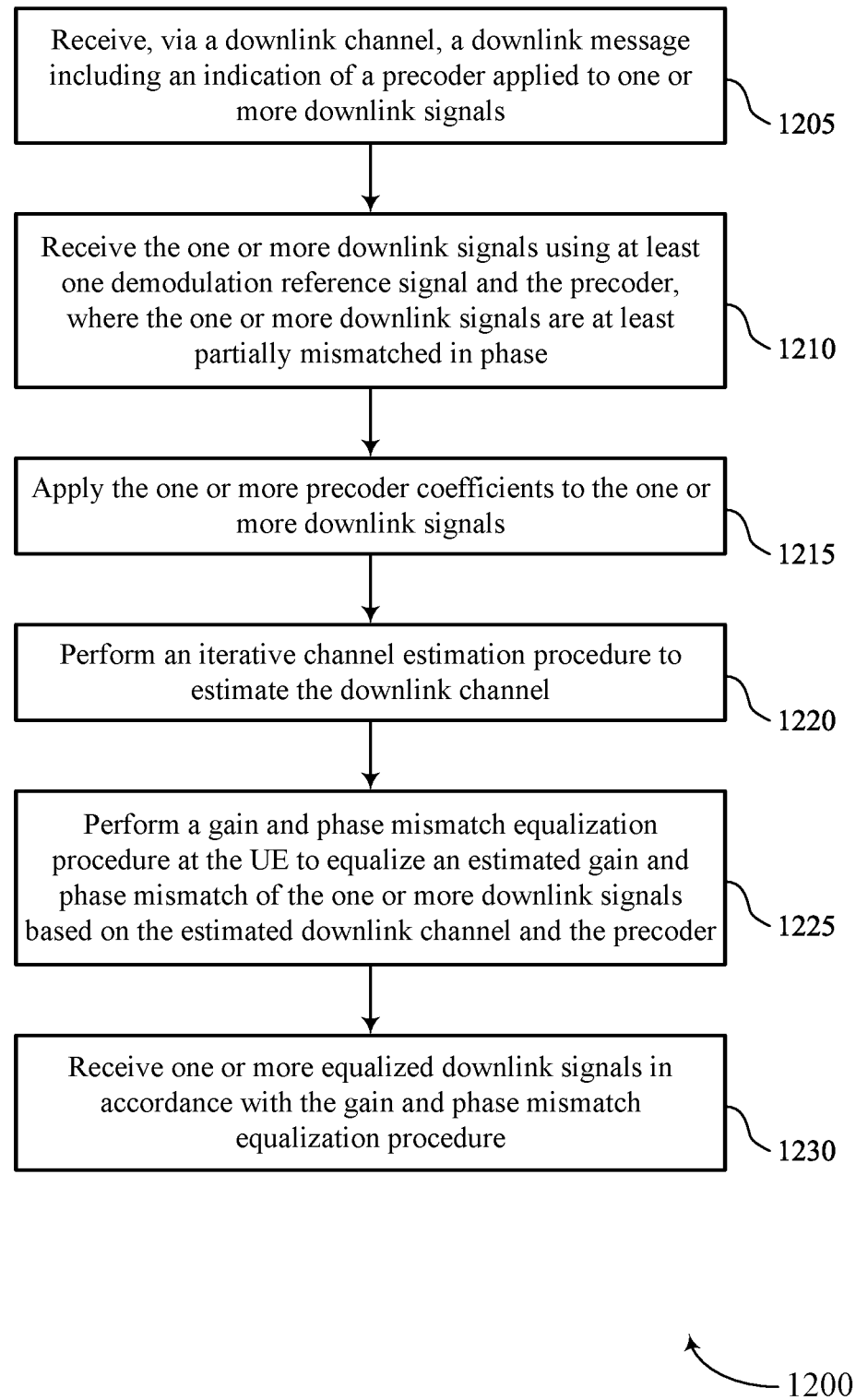

FIG. 12 illustrates a flowchart illustrating a method 1200 that supports joint gain and phase mismatch canceller and equalizer for downlink aided by precoder signaling in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, via a downlink channel, a downlink message including an indication of a precoder applied to one or more downlink signals. The operations of 1205 may be performed in accordance with examples as disclosed herein. In some examples, aspects of the operations of 1205 may be performed by a precoder component 825 as described with reference to FIG. 8.

At 1210, the method may include receiving the one or more downlink signals using at least one DMRS and the precoder, where the one or more downlink signals are at least partially mismatched in gain and phase. The operations of 1210 may be performed in accordance with examples as disclosed herein. In some examples, aspects of the operations of 1210 may be performed by a downlink signal management component 830 as described with reference to FIG. 8.

At 1215, the method may include applying the one or more precoder coefficients to the one or more downlink signals. The operations of 1215 may be performed in accordance with examples as disclosed herein. In some examples, aspects of the operations of 1215 may be performed by a precoder application component 850 as described with reference to FIG. 8.

At 1220, the method may include performing an iterative channel estimation procedure to estimate the downlink channel. The operations of 1220 may be performed in accordance with examples as disclosed herein. In some examples, aspects of the operations of 1220 may be performed by a channel estimation component 835 as described with reference to FIG. 8.

At 1225, the method may include performing a gain and phase mismatch equalization procedure at the UE to equalize an estimated gain and phase mismatch of the one or more downlink signals based on the estimated downlink channel and the precoder. The operations of 1225 may be performed in accordance with examples as disclosed herein. In some examples, aspects of the operations of 1225 may be performed by a mismatch equalization component 840 as described with reference to FIG. 8.

At 1230, the method may include receiving one or more equalized downlink signals in accordance with the gain and phase mismatch equalization procedure. The operations of 1230 may be performed in accordance with examples as disclosed herein. In some examples, aspects of the operations of 1230 may be performed by a downlink signal management component 830 as described with reference to FIG. 8.

The following provides an overview of aspects of the present disclosure:

Aspect 1: A method for wireless communication at a UE, comprising: receiving, via a downlink channel, a downlink message comprising an indication of a precoder applied to one or more downlink signals; receiving the one or more downlink signals using at least one DMRS and the precoder, wherein the one or more downlink signals are at least partially mismatched in gain and phase; performing an iterative channel estimation procedure to estimate the downlink channel; performing a gain and phase mismatch equalization procedure at the UE to equalize an estimated gain and phase mismatch of the one or more downlink signals based at least in part on the estimated downlink channel and the precoder; and receiving one or more equalized downlink signals in accordance with the gain and phase mismatch equalization procedure.

Aspect 2: The method of aspect 1, further comprising: performing the iterative channel estimation procedure to estimate a physical channel associated with the one or more downlink signals using the at least one DMRS; and estimating the estimated gain and phase mismatch based at least in part on the estimated physical channel, the precoder, or both.

Aspect 3: The method of any of aspects1 through 2, wherein the indication of the precoder comprises one or more precoder coefficients, wherein receiving the one or more downlink signals further comprises: applying the one or more precoder coefficients to the one or more downlink signals.

Aspect 4: The method of any of aspects1 through 3, wherein performing the iterative channel estimation procedure further comprises: performing a first channel estimation procedure; performing the gain and phase mismatch equalization procedure; and performing at least a second channel estimation procedure based at least in part on the estimated gain and phase mismatch.

Aspect 5: The method of any of aspects1 through 4, wherein performing the gain and phase mismatch equalization procedure further comprises: cancelling at least a portion of the estimated gain and phase mismatch.

Aspect 6: The method of any of aspects1 through 5, wherein receiving the downlink message comprising the indication of the precoder further comprises: receiving the indication of the precoder via a set of downlink precoded data, wherein one or more precoder coefficients are determined based at least in part on the set of downlink precoded data.

Aspect 7: The method of any of aspects1 through 6, further comprising: performing the gain and phase mismatch equalization procedure and equalizing the estimated gain and phase mismatch of the one or more downlink signals simultaneously.

Aspect 8: The method of any of aspects1 through 7, wherein receiving the one or more downlink signals further comprises: reproducing the one or more downlink signals to use for the gain and phase mismatch equalization procedure based at least in part on the at least one DMRS and the precoder.

Aspect 9: The method of any of aspects1 through 8, wherein receiving the indication of the precoder further comprises: receiving an indication of a time duration, a slot number, or both, for which the precoder is applied to the one or more downlink signals.

Aspect 10: The method of any of aspects1 through 9, wherein a value of the precoder comprises a static value or a pseudo-random value, the method further comprising: performing the gain and phase mismatch equalization procedure based at least in part on the value of the precoder.

Aspect 11: The method of any of aspects1 through 10, wherein the indication of the precoder comprises a first indication of a first precoder, the method further comprising: receiving, via the first indication of the first precoder, a second indication of a second precoder to be applied to the one or more downlink signals after a threshold time duration; and performing the gain and phase mismatch equalization procedure in accordance with the second precoder.

Aspect 12: The method of any of aspects1 through 11, further comprising: receiving, from a network entity, a periodicity indication that indicates a periodicity for which the UE is to perform the gain and phase mismatch equalization procedure based at least in part on one or more operating factors of the network entity.

Aspect 13: The method of any of aspects1 through 12, wherein the gain and phase mismatch equalization procedure comprises an in-phase quadrature-phase (IQ) mismatch equalization procedure.

Aspect 14: The method of any of aspects1 through 13, wherein the estimated gain and phase mismatch is a frequency-dependent gain and phase mismatch.

Aspect 15: An apparatus for wireless communication at a UE, comprising a processor; memory coupled with the processor; and instructions stored in the memory and executable by the processor to cause the apparatus to perform a method of any of aspects1 through 14.

Aspect 16: An apparatus for wireless communication at a UE, comprising at least one means for performing a method of any of aspects1 through 14.

Aspect 17: A non-transitory computer-readable medium storing code for wireless communication at a UE, the code comprising instructions executable by a processor to perform a method of any of aspects1 through 14. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, via a downlink channel, a downlink message comprising an indication of a precoder applied to one or more downlink signals;
    receiving the one or more downlink signals using at least one demodulation reference signal and the precoder, wherein the one or more downlink signals are at least partially mismatched in gain and phase;
    performing an iterative channel estimation procedure to estimate the downlink channel;
    performing a gain and phase mismatch equalization procedure at the UE to equalize an estimated gain and phase mismatch of the one or more downlink signals based at least in part on the estimated downlink channel and the precoder; and
    receiving one or more equalized downlink signals in accordance with the gain and phase mismatch equalization procedure.

2. The method of claim 1, further comprising:
    performing the iterative channel estimation procedure to estimate a physical channel associated with the one or more downlink signals using the at least one demodulation reference signal; and
    estimating the estimated gain and phase mismatch based at least in part on the estimated physical channel, the precoder, or both.

3. The method of claim 1, wherein the indication of the precoder comprises one or more precoder coefficients, wherein receiving the one or more downlink signals further comprises:
    applying the one or more precoder coefficients to the one or more downlink signals.

4. The method of claim 1, wherein performing the iterative channel estimation procedure further comprises:
performing a first channel estimation procedure;
performing the gain and phase mismatch equalization procedure; and
performing at least a second channel estimation procedure based at least in part on the estimated gain and phase mismatch.

5. The method of claim 1, wherein performing the gain and phase mismatch equalization procedure further comprises:
cancelling at least a portion of the estimated gain and phase mismatch.

6. The method of claim 1, wherein receiving the downlink message comprising the indication of the precoder further comprises:
receiving the indication of the precoder via a set of downlink precoded data, wherein one or more precoder coefficients are determined based at least in part on the set of downlink precoded data.

7. The method of claim 1, further comprising:
performing the gain and phase mismatch equalization procedure and equalizing the estimated gain and phase mismatch of the one or more downlink signals simultaneously.

8. The method of claim 1, wherein receiving the one or more downlink signals further comprises:
reproducing the one or more downlink signals to use for the gain and phase mismatch equalization procedure based at least in part on the at least one demodulation reference signal and the precoder.

9. The method of claim 1, wherein receiving the indication of the precoder further comprises:
receiving an indication of a time duration, a slot number, or both, for which the precoder is applied to the one or more downlink signals.

10. The method of claim 1, wherein a value of the precoder comprises a static value or a pseudo-random value, the method further comprising:
performing the gain and phase mismatch equalization procedure based at least in part on the value of the precoder.

11. The method of claim 1, wherein the indication of the precoder comprises a first indication of a first precoder, the method further comprising:
receiving, via the first indication of the first precoder, a second indication of a second precoder to be applied to the one or more downlink signals after a threshold time duration; and
performing the gain and phase mismatch equalization procedure in accordance with the second precoder.

12. The method of claim 1, further comprising:
receiving, from a network entity, a periodicity indication that indicates a periodicity for which the UE is to perform the gain and phase mismatch equalization procedure based at least in part on one or more operating factors of the network entity.

13. The method of claim 1, wherein the gain and phase mismatch equalization procedure comprises an in-phase quadrature-phase mismatch equalization procedure.

14. The method of claim 1, wherein the estimated gain and phase mismatch is a frequency-dependent gain and phase mismatch.

15. An apparatus for wireless communication at a user equipment (UE), comprising:
a processor;
memory coupled with the processor; and
instructions stored in the memory and executable by the processor to cause the apparatus to:
receive, via a downlink channel, a downlink message comprising an indication of a precoder applied to one or more downlink signals;
receive the one or more downlink signals using at least one demodulation reference signal and the precoder, wherein the one or more downlink signals are at least partially mismatched in gain and phase;
perform an iterative channel estimation procedure to estimate the downlink channel;
perform a gain and phase mismatch equalization procedure at the UE to equalize an estimated gain and phase mismatch of the one or more downlink signals based at least in part on the estimated downlink channel and the precoder; and
receive one or more equalized downlink signals in accordance with the gain and phase mismatch equalization procedure.

16. The apparatus of claim 15, wherein the instructions are further executable by the processor to cause the apparatus to:
perform the iterative channel estimation procedure to estimate a physical channel associated with the one or more downlink signals using the at least one demodulation reference signal; and
estimate the estimated gain and phase mismatch based at least in part on the estimated physical channel, the precoder, or both.

17. The apparatus of claim 15, wherein the indication of the precoder comprises one or more precoder coefficients, and the instructions to receive the one or more downlink signals are further executable by the processor to cause the apparatus to:
apply the one or more precoder coefficients to the one or more downlink signals.

18. The apparatus of claim 15, wherein the instructions to perform the iterative channel estimation procedure are further executable by the processor to cause the apparatus to:
perform a first channel estimation procedure;
perform the gain and phase mismatch equalization procedure; and
perform at least a second channel estimation procedure based at least in part on the estimated gain and phase mismatch.

19. The apparatus of claim 15, wherein the instructions to perform the gain and phase mismatch equalization procedure are further executable by the processor to cause the apparatus to:
cancel at least a portion of the estimated gain and phase mismatch.

20. The apparatus of claim 15, wherein the instructions to receive the downlink message comprising the indication of the precoder are further executable by the processor to cause the apparatus to:
receive the indication of the precoder via a set of downlink precoded data, wherein one or more precoder coefficients are determined based at least in part on the set of downlink precoded data.

21. The apparatus of claim 15, wherein the instructions are further executable by the processor to cause the apparatus to:
perform the gain and phase mismatch equalization procedure and equalizing the estimated gain and phase mismatch of the one or more downlink signals simultaneously.

22. The apparatus of claim 15, wherein the instructions to receive the one or more downlink signals are further executable by the processor to cause the apparatus to:

reproduce the one or more downlink signals to use for the gain and phase mismatch equalization procedure based at least in part on the at least one demodulation reference signal and the precoder.

23. The apparatus of claim 15, wherein the instructions to receive the indication of the precoder are further executable by the processor to cause the apparatus to:

receive an indication of a time duration, a slot number, or both, for which the precoder is applied to the one or more downlink signals.

24. The apparatus of claim 15, wherein a value of the precoder comprises a static value or a pseudo-random value, and the instructions are further executable by the processor to cause the apparatus to:

perform the gain and phase mismatch equalization procedure based at least in part on the value of the precoder.

25. The apparatus of claim 15, wherein the indication of the precoder comprises a first indication of a first precoder, and the instructions are further executable by the processor to cause the apparatus to:

receive, via the first indication of the first precoder, a second indication of a second precoder to be applied to the one or more downlink signals after a threshold time duration; and perform the gain and phase mismatch equalization procedure in accordance with the second precoder.

26. The apparatus of claim 15, wherein the instructions are further executable by the processor to cause the apparatus to:

receive, from a network entity, a periodicity indication that indicates a periodicity for which the UE is to perform the gain and phase mismatch equalization procedure based at least in part on one or more operating factors of the network entity.

27. The apparatus of claim 15, wherein the gain and phase mismatch equalization procedure comprises an in-phase quadrature-phase mismatch equalization procedure.

28. The apparatus of claim 15, wherein the estimated gain and phase mismatch is a frequency-dependent gain and phase mismatch.

29. An apparatus for wireless communication at a user equipment (UE), comprising:

means for receiving, via a downlink channel, a downlink message comprising an indication of a precoder applied to one or more downlink signals;

means for receiving the one or more downlink signals using at least one demodulation reference signal and the precoder, wherein the one or more downlink signals are at least partially mismatched in gain and phase;

means for performing an iterative channel estimation procedure to estimate the downlink channel;

means for performing a gain and phase mismatch equalization procedure at the UE to equalize an estimated gain and phase mismatch of the one or more downlink signals based at least in part on the estimated downlink channel and the precoder; and means for receiving one or more equalized downlink signals in accordance with the gain and phase mismatch equalization procedure.

30. A non-transitory computer-readable medium storing code for wireless communication at a user equipment (UE), the code comprising instructions executable by a processor to:

receive, via a downlink channel, a downlink message comprising an indication of a precoder applied to one or more downlink signals;

receive the one or more downlink signals using at least one demodulation reference signal and the precoder, wherein the one or more downlink signals are at least partially mismatched in phase;

perform an iterative channel estimation procedure to estimate the downlink channel;

perform a gain and phase mismatch equalization procedure at the UE to equalize an estimated gain and phase mismatch of the one or more downlink signals based at least in part on the estimated downlink channel and the precoder; and receive one or more equalized downlink signals in accordance with the gain and phase mismatch equalization procedure.

* * * * *